United States Patent
Poplawsli et al.

(10) Patent No.: US 6,651,529 B1
(45) Date of Patent: Nov. 25, 2003

(54) HYDROSTATIC TRANSMISSION

(75) Inventors: Herb M. Poplawsli, Sullivan, IL (US); Thomas D. Wiley, Lovington, IL (US); John D. Schreier, Fitchburg, WI (US); Michael L. Bennett, Sullivan, IL (US); Lonnie E. Holder, Sullivan, IL (US); Ralph A. McClelland, Effingham, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/187,931

(22) Filed: Jul. 2, 2002

(51) Int. Cl.⁷ .................... F16H 57/02; B60K 17/00; B60K 17/16
(52) U.S. Cl. .................... 74/607; 74/606 R; 475/72; 180/348; 180/374; 180/378
(58) Field of Search .................. 74/607, 606 R; 475/74, 78, 76, 80, 72; 180/348, 358, 374, 376, 378

(56) References Cited

U.S. PATENT DOCUMENTS

| | | | |
|---|---|---|---|
| 3,628,399 A | * | 12/1971 | Seitz et al. ............. 475/88 |
| 3,808,715 A | * | 5/1974 | Haban ............. 37/260 |
| RE29,356 E | | 8/1977 | Bennett |
| 4,050,169 A | | 9/1977 | Pasquier |
| 4,127,951 A | | 12/1978 | Hatch |
| 4,143,475 A | | 3/1979 | Schmidt et al. |
| 4,145,824 A | | 3/1979 | Watson |
| 4,151,663 A | | 5/1979 | Schmidt |
| 4,346,527 A | | 8/1982 | Schmidt |
| 4,354,320 A | | 10/1982 | Schmidt |
| 4,367,603 A | * | 1/1983 | Schlapman ............. 37/251 |
| 4,391,052 A | | 7/1983 | Guy, Jr. |
| 4,404,763 A | | 9/1983 | Sakano et al. |
| 4,435,996 A | * | 3/1984 | Gorby ............. 475/247 |
| 4,506,465 A | | 3/1985 | Johnson |
| 4,549,365 A | | 10/1985 | Johnson |
| 4,563,867 A | | 1/1986 | Bokon |
| 4,577,712 A | | 3/1986 | Foote et al. |
| 4,589,249 A | | 5/1986 | Walker et al. |
| 4,592,156 A | | 6/1986 | Schmidt |
| 4,597,203 A | | 7/1986 | Middleton |
| 4,615,129 A | | 10/1986 | Jackson |
| 4,625,990 A | | 12/1986 | Orth et al. |
| 4,651,452 A | | 3/1987 | Husso |
| 4,658,662 A | | 4/1987 | Rundle |
| 4,719,743 A | | 1/1988 | Bokon |
| 4,720,233 A | | 1/1988 | Meyer et al. |
| 4,744,582 A | | 5/1988 | Wykhuis et al. |
| 4,790,085 A | | 12/1988 | Rossman |
| 4,807,904 A | | 2/1989 | Kamlukin et al. |
| 4,826,389 A | | 5/1989 | Meyer et al. |

(List continued on next page.)

*Primary Examiner*—Sherry Estremsky
*Assistant Examiner*—Tisha D. Lewis
(74) *Attorney, Agent, or Firm*—Neal, Gerber & Eisenberg

(57) ABSTRACT

A hydrostatic transmission mountable to a vehicle frame. The hydrostatic transmission is adapted to removeably receive an axle shaft. The hydrostatic transmission is also adapted to be mounted to at least one of two opposed side members of the vehicle frame. The opposed side members have openings though which the axle shaft passes. The vehicle may be a snow thrower.

60 Claims, 27 Drawing Sheets

U.S. PATENT DOCUMENTS

| | | | |
|---|---|---|---|
| 4,869,003 A | | 9/1989 | O'Loughlin |
| 4,897,942 A | * | 2/1990 | Klas et al. .................... 37/244 |
| 4,949,805 A | | 8/1990 | Mather et al. |
| 4,969,533 A | | 11/1990 | Holm et al. |
| 5,000,302 A | * | 3/1991 | Takeshita .................. 192/17 R |
| 5,006,100 A | | 4/1991 | Brandt et al. |
| 5,074,373 A | | 12/1991 | Schmidt |
| 5,123,805 A | | 6/1992 | Ishimori et al. |
| 5,174,595 A | | 12/1992 | Snipes |
| 5,203,250 A | | 4/1993 | Sundberg |
| 5,209,003 A | | 5/1993 | Maxfield et al. |
| 5,297,351 A | | 3/1994 | Cote |
| 5,389,752 A | | 2/1995 | Karbassi |
| 5,449,140 A | | 9/1995 | Lastowski |
| 5,477,600 A | | 12/1995 | Houle et al. |
| 5,513,453 A | | 5/1996 | Norton |
| 5,522,339 A | | 6/1996 | Pelly |
| 5,540,004 A | | 7/1996 | Patterson et al. |
| 5,653,509 A | | 8/1997 | Bieri, Jr. |
| 5,711,139 A | | 1/1998 | Swanson |
| 5,743,347 A | | 4/1998 | Gingerich |
| 5,784,756 A | | 7/1998 | Slocum et al. |
| 5,784,870 A | | 7/1998 | Seegert et al. |
| 5,787,613 A | | 8/1998 | Derome |
| 5,857,843 A | * | 1/1999 | Leason et al. ........... 417/477.9 |
| 5,911,672 A | | 6/1999 | Schaedler et al. |
| 5,971,881 A | | 10/1999 | Jolliff |
| 5,989,356 A | | 11/1999 | Candeletti |
| 6,009,642 A | | 1/2000 | Nugent |
| 6,010,423 A | | 1/2000 | Jolliff et al. |
| 6,061,617 A | | 5/2000 | Berger et al. |
| 6,085,502 A | | 7/2000 | Wians et al. |
| 6,089,341 A | | 7/2000 | Gingerich |
| 6,098,385 A | | 8/2000 | Turk |
| 6,105,348 A | | 8/2000 | Turk et al. |
| 6,131,316 A | | 10/2000 | Yoshina et al. |
| 6,154,985 A | | 12/2000 | Champagne et al. |
| 6,155,033 A | | 12/2000 | Wians et al. |
| 6,185,920 B1 | | 2/2001 | Oxley |
| 6,199,354 B1 | | 3/2001 | King et al. |
| 6,230,608 B1 | | 5/2001 | Schaedler et al. |
| 6,240,660 B1 | | 6/2001 | Dugas |
| 6,247,254 B1 | | 6/2001 | Wessman |
| 6,260,293 B1 | | 7/2001 | Monroe |
| 6,266,598 B1 | | 7/2001 | Pillar et al. |
| 6,305,105 B1 | | 10/2001 | Lowman |
| 6,305,204 B1 | | 10/2001 | Tauzer |
| 6,347,671 B1 | | 2/2002 | Stiller et al. |
| 6,347,753 B1 | | 2/2002 | Anderson |
| 6,367,176 B1 | | 4/2002 | Zaugg et al. |
| 6,391,120 B1 | | 5/2002 | Silva |

* cited by examiner

HYDROSTATIC TRANSMISSION

BACKGROUND OF THE INVENTION

This invention relates generally to hydrostatic transmissions.

Hydrostatic transmissions ("HSTs"), including integrated hydrostatic transmissions ("IHTs"), are well known in the art and are more fully described in, among others, U.S. Pat. No. 5,314,387, which is incorporated herein by reference in its entirety. Generally, an HST includes a center section or the like on which is mounted a hydraulic pump and a hydraulic motor. The hydraulic pump and the hydraulic motor each carry a plurality of reciprocating pistons that are in fluid communication through porting formed in the center section. As the hydraulic pump rotates, the pump pistons move axially as they bear against an adjustable swash plate where the degree of axial movement depends upon the angular orientation of the swash plate. Axial movement of the pump pistons forces a hydraulic fluid through the porting, which forces the motor pistons against a thrust bearing to thereby rotate the hydraulic motor. As the hydraulic motor rotates, hydraulic fluid is returned to the hydraulic pump through the porting. In this manner, the rotation of the hydraulic pump is translated to the hydraulic motor and the rotation of the hydraulic motor may be used to drive one or more axles of a riding lawn mower, small tractor, or the like.

In the art, it is also known to provide an HST for use in connection with a snow thrower. For example, U.S. Pat. No. 6,131,316 to Yoshina describes a snow thrower machine having an axle driving unit in the form of an IHT. The described IHT includes a housing, consisting of a front housing section and a rear housing section, that supports an axle. Disposed in the housing are a hydraulic pump, which receives power from an engine, a hydraulic motor, which is driven by pressurized oil received from the hydraulic pump and a center section, having a pump mounting surface parallel to a joint surface between the front housing section and the rear housing section. The axle is supported by the front housing below the hydraulic pump.

While these known IHTs work for their intended purpose, they do suffer various disadvantages. By way of example, mounting known IHTs to a vehicle frame is relatively costly and time consuming. This is particularly true since the non-removeable nature of the axle shaft requires the vehicle frame to have cut-out portions in which the axle shaft may be accommodated. This requires the use of additional hardware to then support the axle shaft within the cut-out portions. Still further, vehicle manufacturers are limited in selecting axle shaft sizes to meet specific operation demands for a vehicle.

SUMMARY OF THE INVENTION

To overcome these and other disadvantages, a hydrostatic transmission is described that is adapted to removeably receive an axle shaft. The hydrostatic transmission is also adapted to be mounted to at least one of two opposed side members of the vehicle frame. The opposed side members have openings through which the axle shaft passes.

A better understanding of the objects, advantages, features, properties and relationships of the invention will be obtained from the following detailed description and accompanying drawings, which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which.

DETAILED DESCRIPTION

Figure 3:
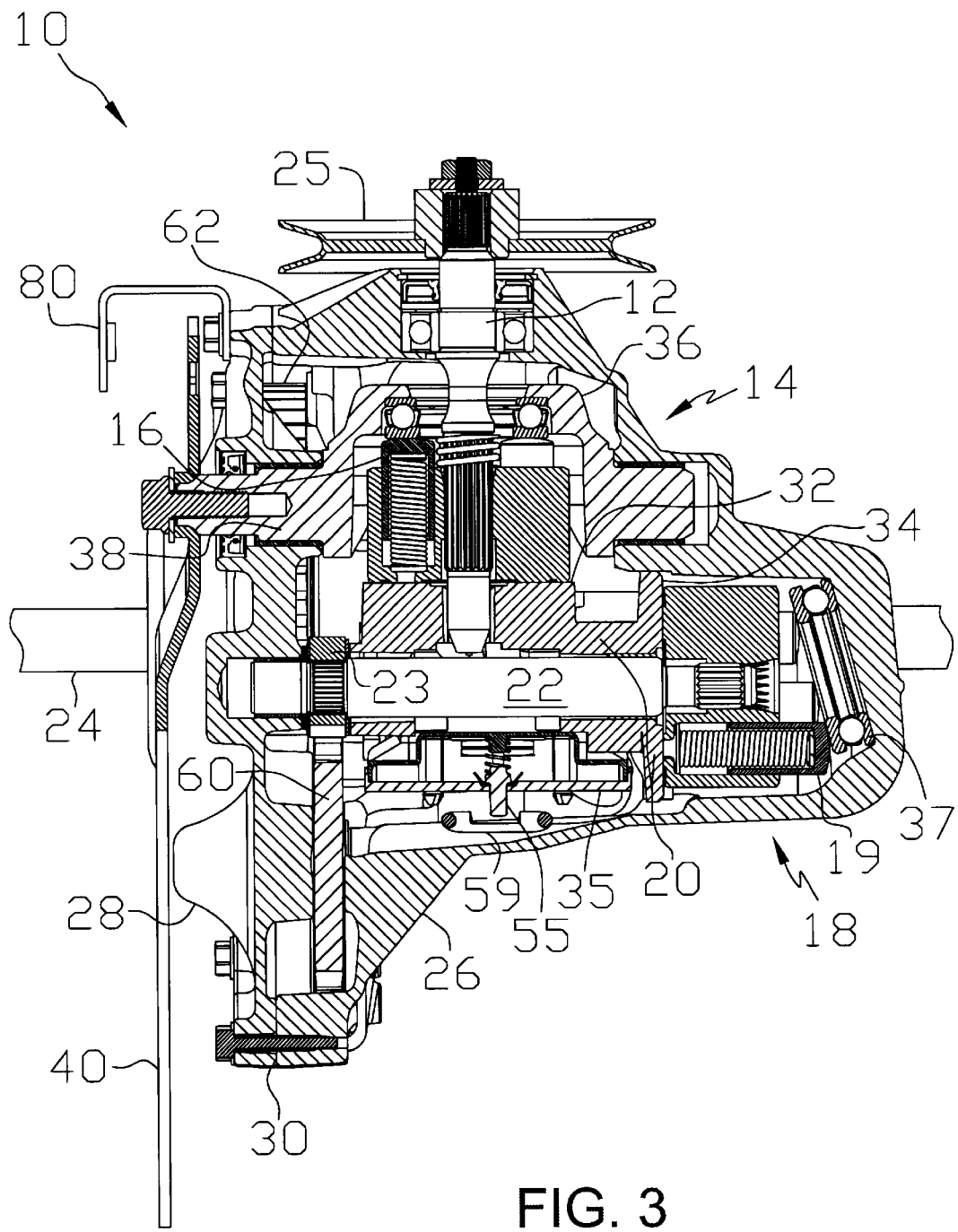
FIG. 3 illustrates a cross-sectional view of the exemplary hydrostatic transmission along line III—III of FIG. 1.
Figure 25:
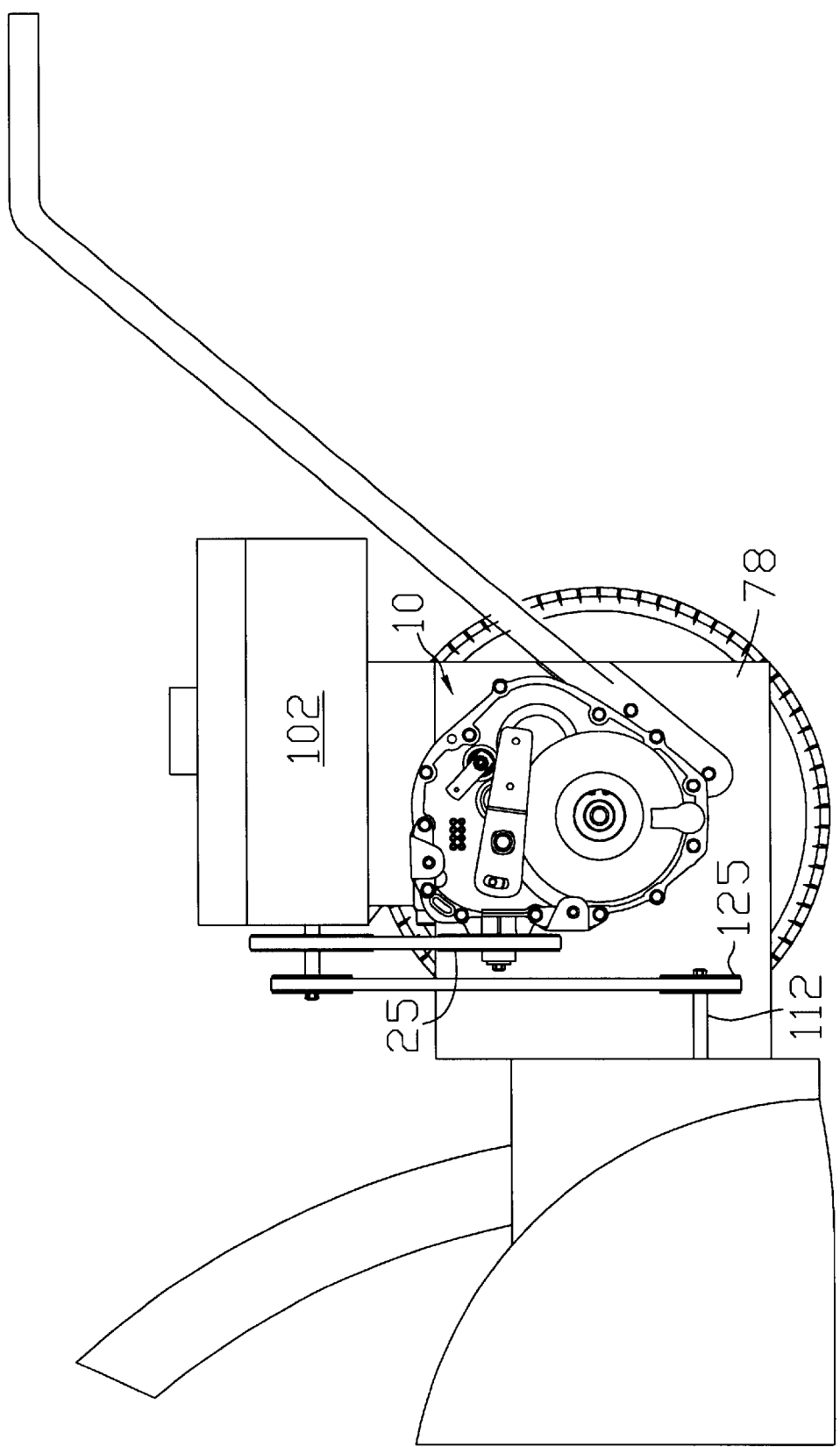
FIG. 25 illustrates the hydrostatic transmission of FIG. 1 mounted to a vehicle frame, in the form of a snow-thrower, in which a tire, some framework, and some controls have been removed for the sake of clarity.

Turning now to the figures, wherein like reference numerals refer to like elements, there is illustrated in FIG. 25 a hydrostatic transmission 10 in the form of an IHT that is configured for improved mounting on a vehicle frame 78, in particular, the vehicle frame of a snow thrower. As will be understood by those of skill in the art, and illustrated in FIG. 3, the IHT 10 generally operates on the principle of an input shaft 12 rotatably driving a hydraulic pump 14 which, through the action of its pump pistons 16, pushes hydraulic fluid to a hydraulic motor 18 through porting formed in a center section 20 to cause the rotation of the hydraulic motor 18. The rotation of the hydraulic motor 18 causes the rotation of a motor shaft 22 which rotation is eventually transferred through a gearing system or the like to drive one or, through a differential (not shown), a pair of axle shafts 24. A motive force from, for example, an engine 102 may be supplied directly to the input shaft 12 or indirectly by means of a pulley 25. For a more detailed description of the principles of operation of such a hydrostatic transmission, the reader is referred to U.S. Pat. Nos. 5,201,692, 6,322,474 and 6,122,996 which are incorporated herein by reference in their entirety.

Figure 1:
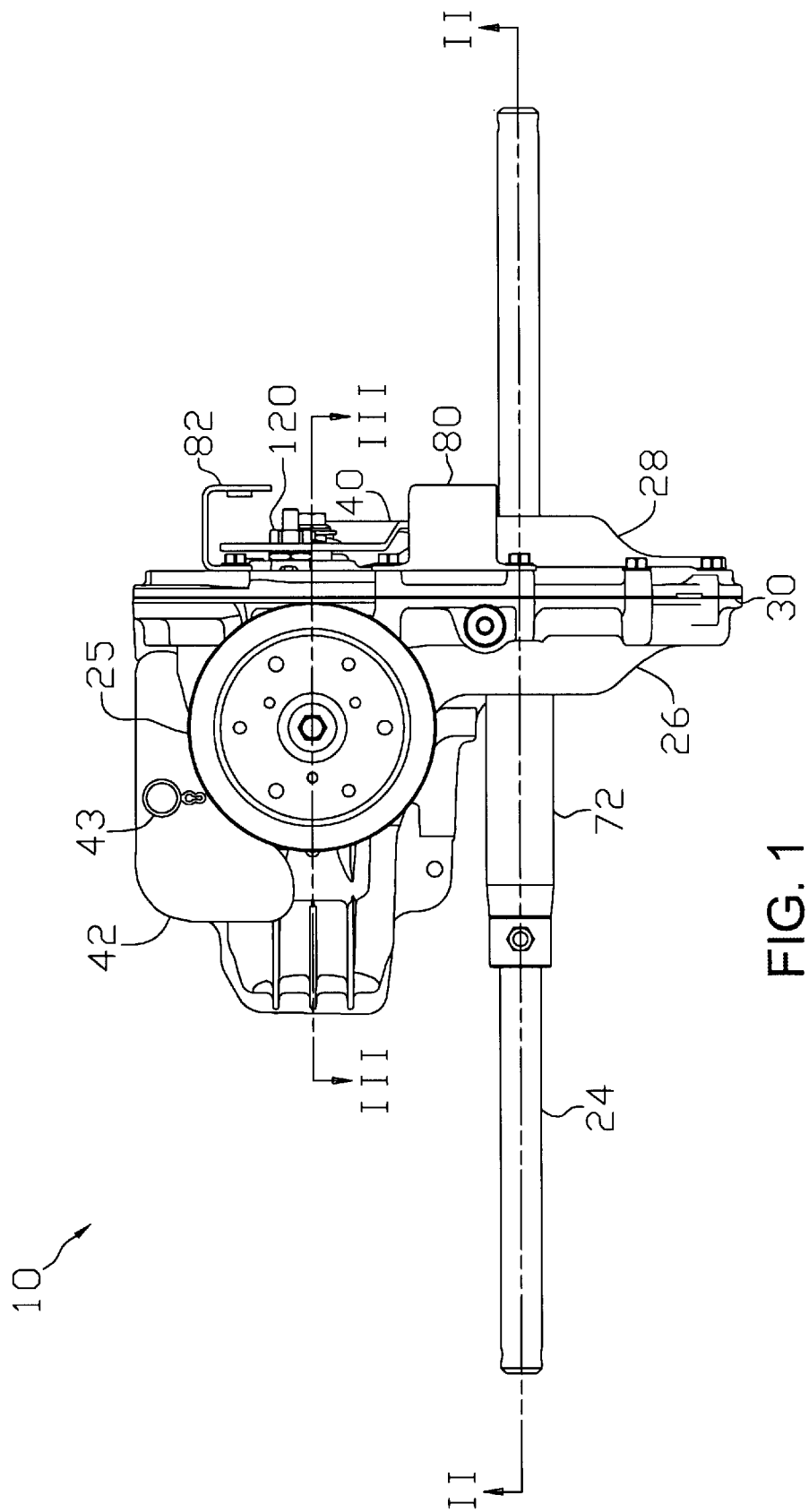
FIG. 1 illustrates a front view of an exemplary embodiment of a hydrostatic transmission constructed in accordance with the principles of the subject invention.

To support the components of the IHT 10, illustrated in FIG. 1 and the figures that follow, the IHT 10 is provided with a housing comprised of a first side housing section 26 and a second side housing section 28 that are joined along a substantially vertical junction surface 30. Extending from the top of the first side housing section 26 is the input shaft 12. Meanwhile, the axle shaft 24 extends from both the first side housing section 26 and the second side housing section 28. Thus, in the illustrated embodiment, the axis of the axle shaft 24 is generally perpendicular to the substantially vertical junction surface 30. Similarly, in the illustrated embodiment, since the center section 20 is generally "L" shaped, the plane of the pump running surface 32 of the center section 20 is generally perpendicular to the substantially vertical junction surface 30 while the plane of the motor running surface 34 of the center section 20 is generally parallel to the substantially vertical junction surface 30. The axis of the motor shaft 22 is, accordingly, generally parallel to the axis of the axle shaft 24 and perpendicular to the axis of the input shaft 12. It is to be understood, however, that this arrangement of components is merely illustrative and that the components can be otherwise arranged without departing from the scope of this invention.

For placing the hydraulic pump 14 in fluid communication with the hydraulic motor 18, the center section 20 includes hydraulic porting. The hydraulic porting is in further fluid communication with a source of makeup fluid, such as a fluid sump or a charge gallery. Generally, the hydraulic porting comprises a high pressure side through which fluid moves from the hydraulic pump 14 to the hydraulic motor 18 and a low pressure side through which fluid returns from the hydraulic motor 18 to the hydraulic pump 14. A filter assembly 35 may be positioned adjacent the center section 20, intermediate the sump and the hydraulic porting, to minimize the introduction of impurities, such as metal shavings, into the hydraulic circuit when makeup fluid is drawn into the hydraulic circuit.

To adjust the amount of oil that is pushed from the hydraulic pump 14 to the hydraulic motor 18 via the high pressure side hydraulic porting, the IHT 10 includes a moveable swash plate 36 against which the pump pistons 16 travel. The direction of rotation of the hydraulic pump 14 is fixed by the rotation of the input shaft 12. The hydraulic pump 16 is nearly always rotated in one direction. As will be understood by those of ordinary skill in the art, the swash plate 36 may be moved to a variety of positions to vary the stroke of the pump pistons 16 and the direction of rotation of the hydraulic motor 18. Generally, as the swash plate 36 angle is varied in one direction from the neutral position the stroke of the pump pistons 16 is varied, which then drives the hydraulic motor 18 in a direction determined by the hydraulic porting at a speed determined by the volume of the fluid displaced by the pump pistons 16 and the torque delivered by the input shaft 12. As will be appreciated, rotation of the hydraulic motor 18 results from the motor pistons 19 moving against a thrust bearing 37 under the influence of the hydraulic fluid. As the angle of the swash plate 36 is decreased to pass through the neutral position, the direction of rotation of the hydraulic motor 18 is reversed and the speed of the hydraulic motor 18 is again determined by the volume of fluid displaced by the pump pistons 16 and the torque delivered by the input shaft 12. Since the speed of rotation of the hydraulic motor 18 is dependent upon the amount of hydraulic fluid pumped thereinto by the hydraulic pump 16 and the direction of rotation of the hydraulic motor 18 is dependent upon the direction of angular rotation of the swash plate 36, the positioning of the swash plate 36 is seen to control the speed and direction of rotation of the hydraulic motor 18 and, as will be apparent, the speed and direction of rotation of the axle shaft 24. While it is true that the direction of rotation of the hydraulic motor 18 will be affected by the rotation of the hydraulic pump 16, the variation of rotation from one direction to another is accomplished completely by the swash plate 36.

Figure 4:
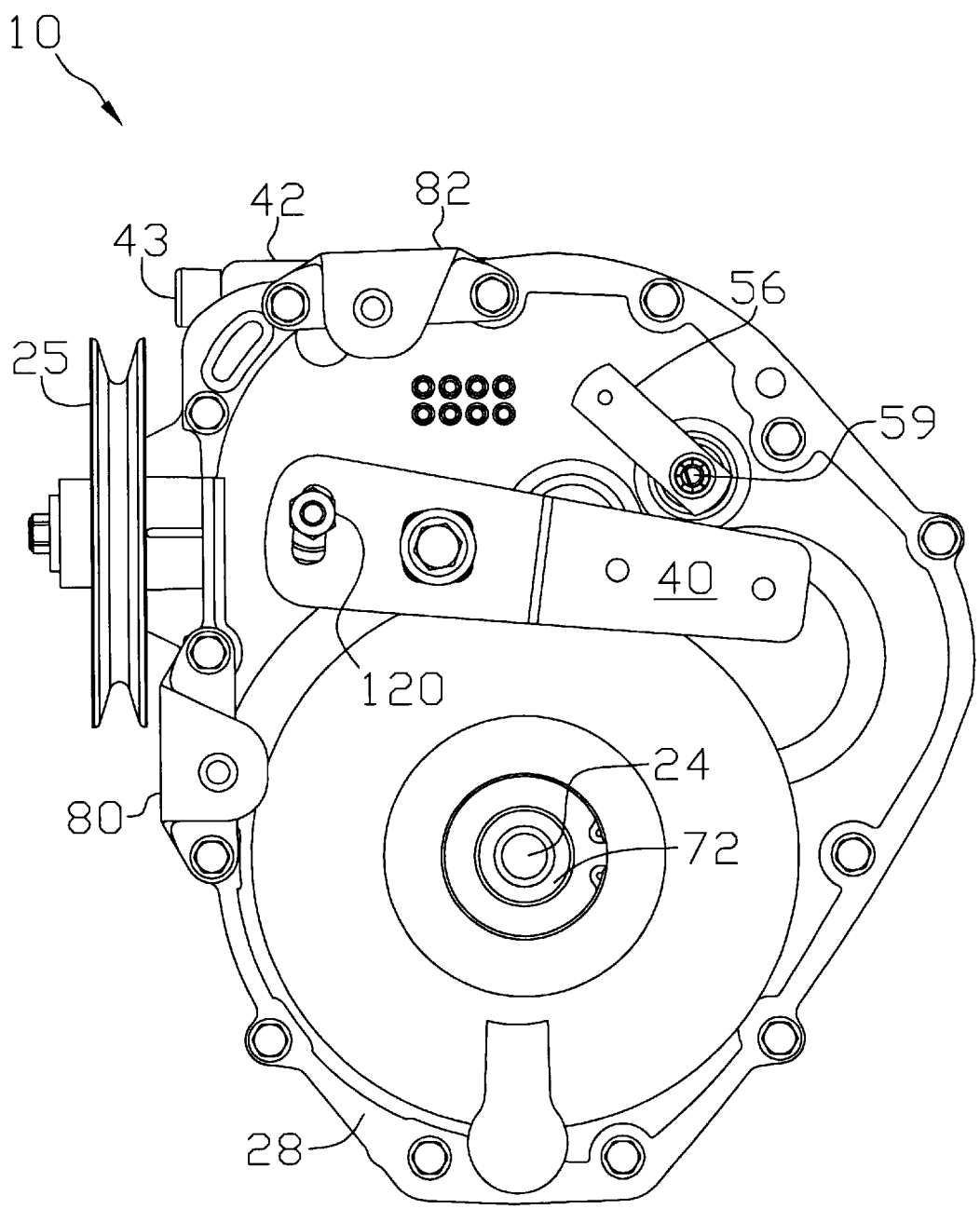
FIG. 4 illustrates a left side view of the exemplary hydrostatic transmission of FIG. 1.
Figure 5:
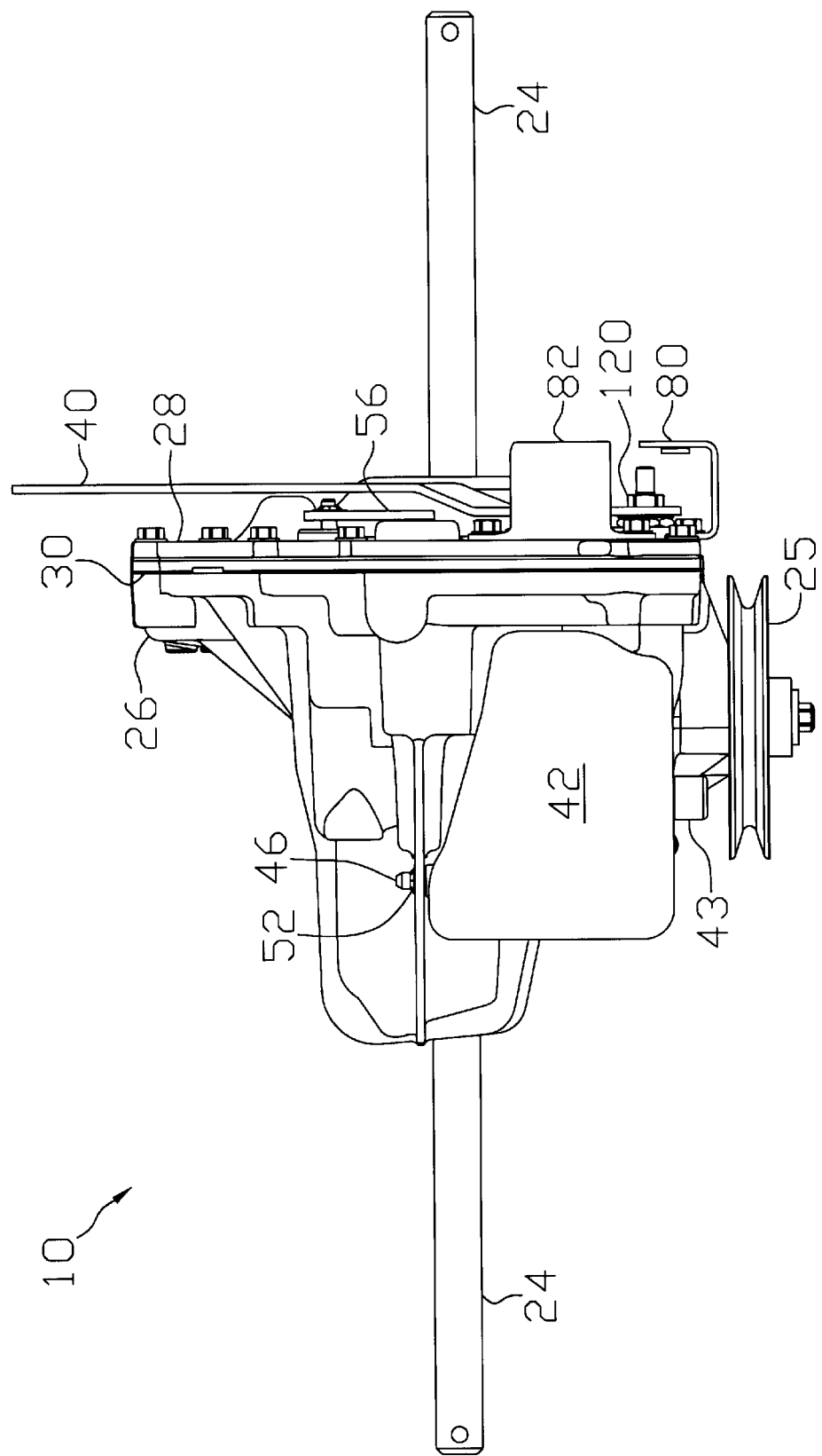
FIG. 5 illustrates a top side view of the exemplary hydrostatic transmission of FIG. 1.
Figure 7:
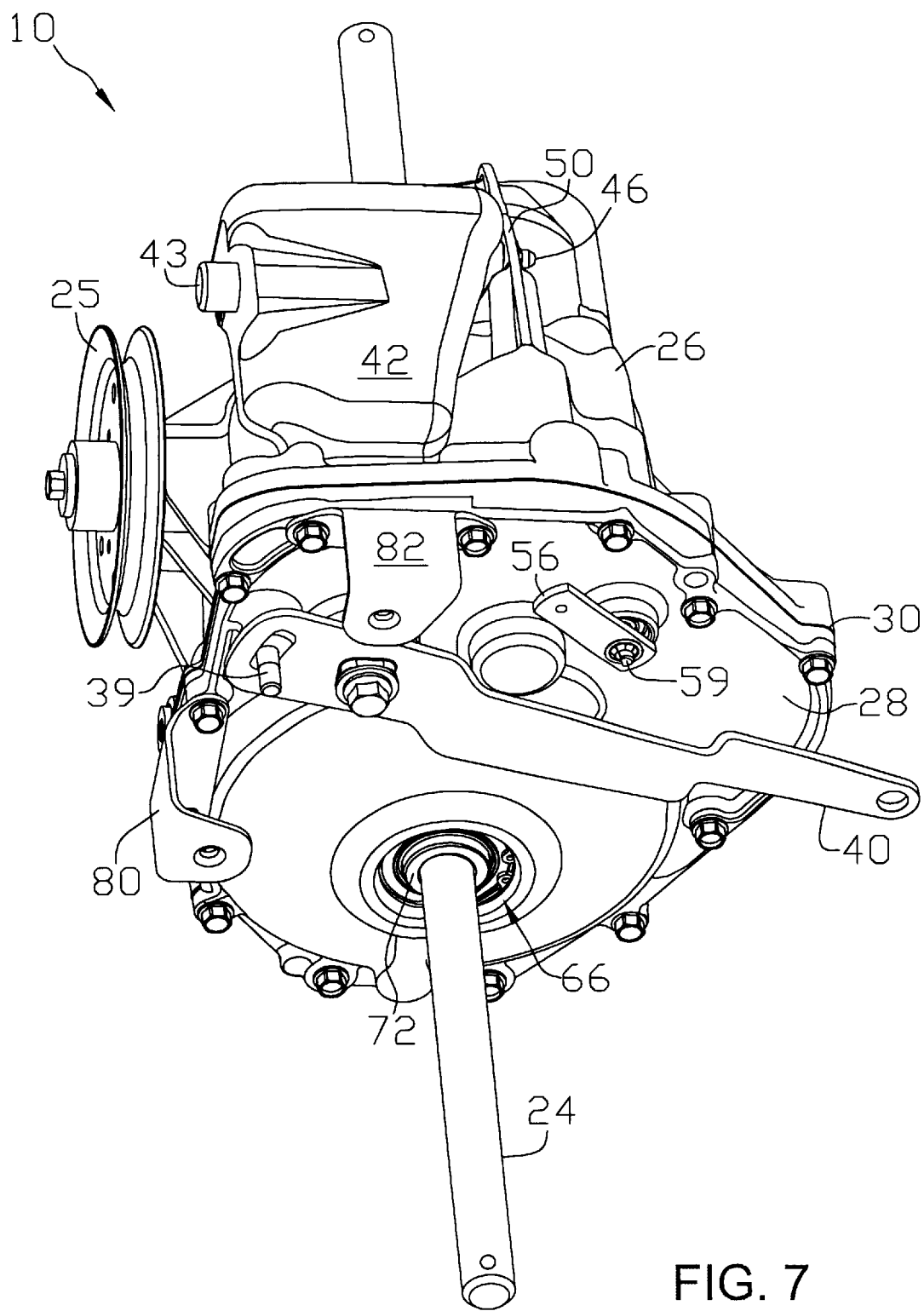
FIG. 7 illustrates a perspective view of the exemplary hydrostatic transmission of FIG. 1.
Figure 8:
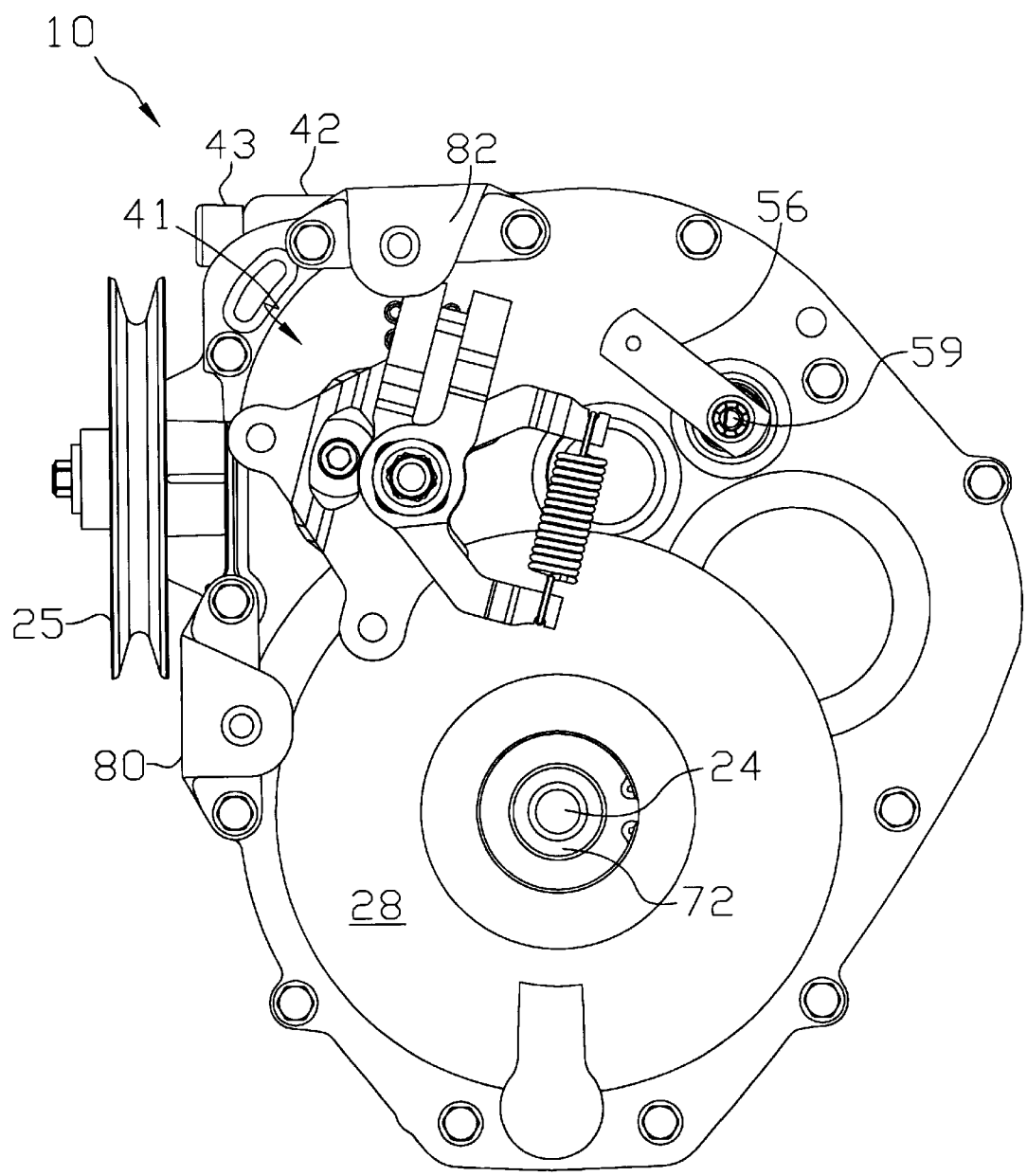
FIG. 8 illustrates a left side view of the exemplary hydrostatic transmission of FIG. 1 including an optional return to neutral mechanism.

For moving the swash plate 36, the swash plate assembly has a trunnion arm 38 that is rotatably supported in the housing of the IHT 10. As will be appreciated, rotation of the trunnion arm 38 changes the angular orientation of the swash plate assembly with respect to the pump pistons 16. To rotate the trunnion arm 38 and, accordingly, move the swash plate assembly, a speed adjusting mechanism is coupled to the trunnion arm 38. A control arm 40 of the speed adjusting mechanism may be connected, via a driving link, to a lever or a pedal provided on a vehicle whereby movement of the lever or pedal is translated to the control arm 40 to cause the rotation of the trunnion arm 38 and movement of the swash plate assembly. As illustrated in FIG. 7, the control arm 40 may be provided with a slot that cooperates with a stop 39, such as a bolt or the like attached to the housing, the serves to limit the range of motion of the control arm 40. It will be appreciated that the control arm 40 may be locked into the neutral position, for example during shipment and assembly into a vehicle of the IHT 10, as is particularly seen in FIG. 4. To this end, a nut 120 may be attached to the stop 39 to frictionally engage the control arm mechanism and thereby prevent its movement. As additionally illustrated in the figures, the slot of the control arm 40 is preferably asymmetrical to thereby allow a greater speed to be imparted to the axle 24 in the forward direction as compared to the reverse direction. A further, exemplary speed adjusting mechanism with a return to neutral mechanism 41 is illustrated in FIG. 8 that is described in U.S. patent application Ser. No. 09/789,419 that is incorporated herein by reference in its entirety.

Figure 20:
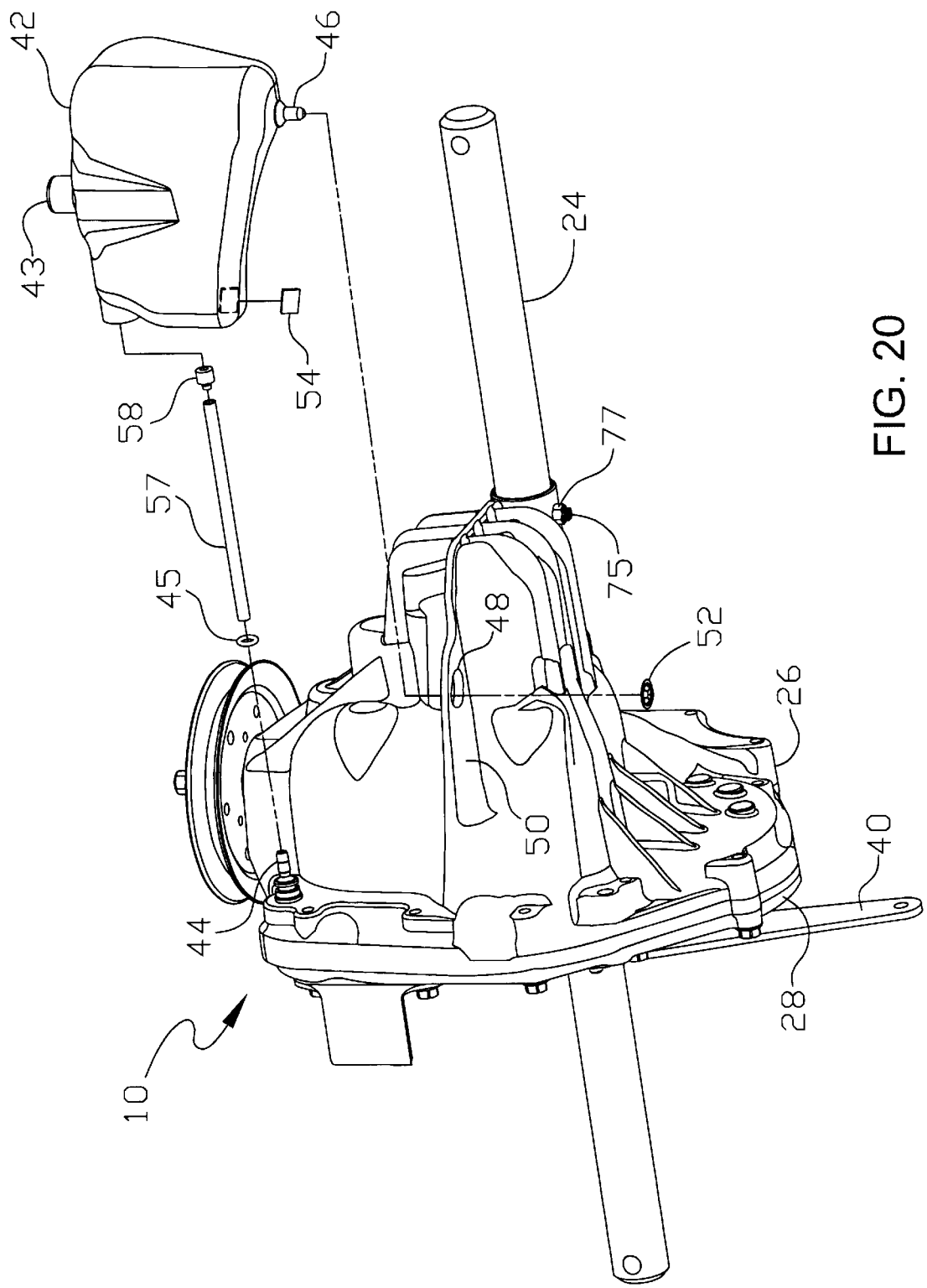
FIG. 20 illustrates a view of the hydrostatic transmission of FIG. 1 with the expansion tank prior to assembly.

To provide a space for hydraulic fluid to expand into during operation of the IHT 10, the IHT 10 may include a siphoning expansion tank 42 that is mounted to the upper portion of the first housing section 26 as particularly illustrated in FIG. 20. In the illustrated embodiment, the housing section 26 includes a fluid passage defined within a fitting 44 that is attachable to the housing section 26 (or integrally formed therewith) with which a siphoning tube 57 is adapted to sealingly engage. Sealing engagement between the fitting 44 and the siphoning tube 57 may be accomplished using an O-ring 45 or the like. To maintain the siphoning tube 57 in the proper position within the expansion tank 42, a weight or "clunker" 58 can be provided proximate to the end of the siphoning tube. The clunker 58 allows the siphoning tube 57 to be positioned towards the bottom of the expansion tank 42 when the IHT 10 is mounted to be driven in either a vertical or horizontal orientation. Venting of the expansion tank 42 to atmosphere is accomplished via a breather vent 43 that is preferably positioned in the upper portion of the expansion tank 42. Again, the breather vent 43 is positioned on the expansion tank 42 to allow the IHT 10 to be mounted in either a vertical or horizontal orientation without experiencing fluid leakage from the breather vent 43. While described in the context of a siphoning expansion tank, which is preferred to minimize space requirements for the IHT 10, it will be appreciated that the expansion tank could also be of the non-siphoning variety.

To provide relatively movement-free engagement between the expansion tank 42 and the IHT housing section 26, the expansion tank 42 may be provided with a means for being secured to the housing at a further point of attachment beyond its engagement with the fitting 44. For example, the expansion tank 42 can be provided with a protrusion 46 which extends from the expansion tank 42 that may be secured within an opening 48 formed in an exterior flange 50 or the like component formed on or attached to the IHT housing section 26. In this regard, the expansion tank 42 and the protrusion 46 may be formed from a plastic material and a fastener 52, such as a push nut, retaining ring or the like, may be forced into mating engagement with the plastic protrusion 46 to hold the expansion tank 44 firmly against the IHT housing section 26. For ease of assembly, the opening 48 may be formed in the shape of an elongated slot so as to accept insertion of the protrusion 46 as the expansion tank 42 is slidingly mounted over the fitting 44. An optional piece of resilient material 54, such as a rubber pad or the like, can be positioned between the expansion tank 42 and the housing section 26 to further minimize any movement of the expansion tank 42 during operation of the IHT 10. Preferably, the resilient material is attached to one or both of the expansion tank 42 and the housing section 26, for example, using an adhesive or the like.

Figure 21:
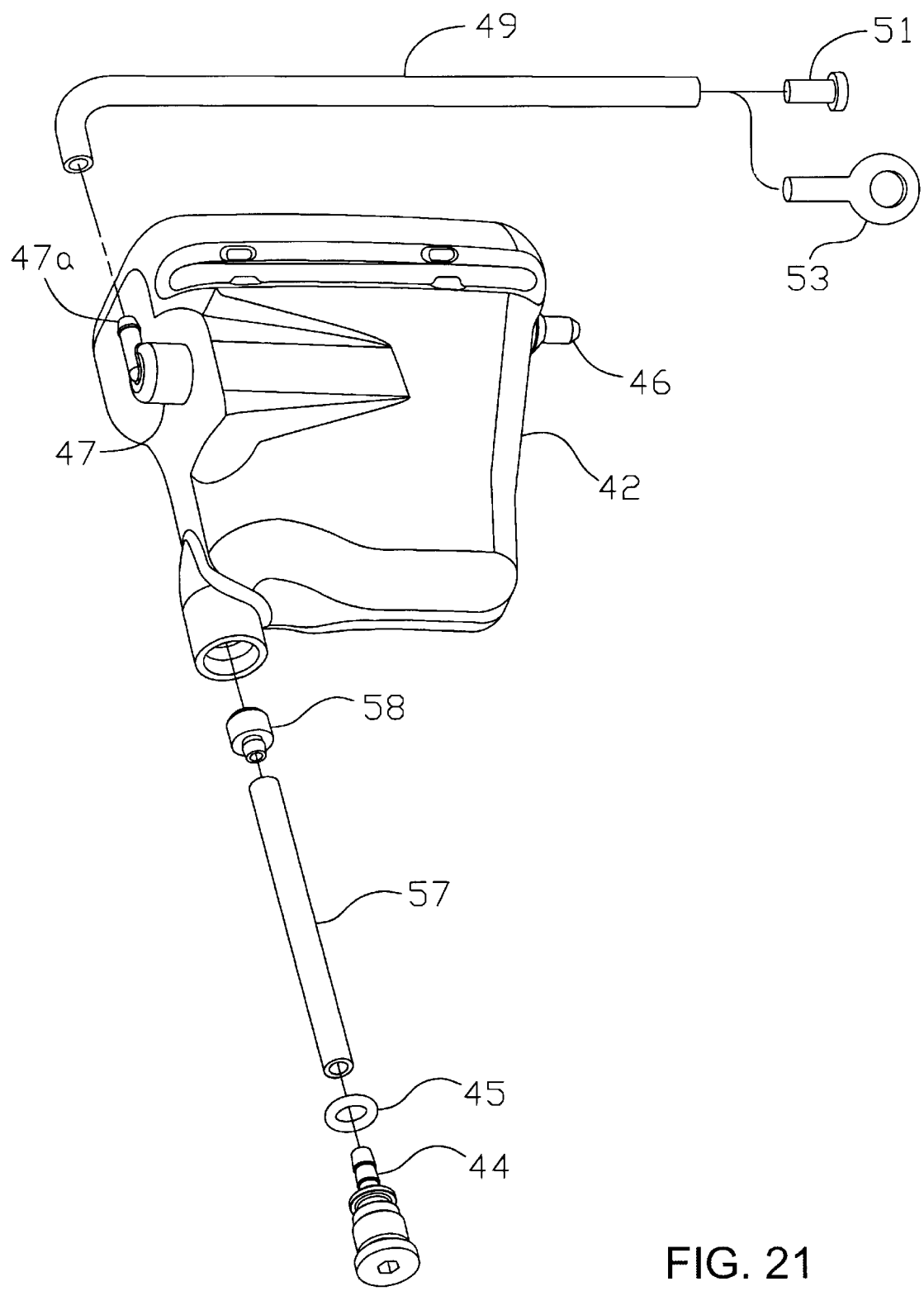
FIG. 21 illustrates an exploded view of the expansion tank with an optional breather tube assembly.

In a further embodiment of the expansion tank illustrated in FIG. 21, a fitting 47 is attached to the expansion tank 42 to which a breather tube 49 having a breather 51 is attachable. This configuration increases the usable volume of the expansion tank 42 by placing the breather inlet higher than the expansion tank 42, particularly when the input shaft 12 is oriented horizontally, and also decreases the possibility of leakage from the breather during shipment, installation, and operation. The fitting 47 may include a barb 47a that allows the breather tube 49 to be interference fit to the fitting 47. The breather 51 could be replaced with a plug 53 to plug the breather tube 49 during shipping and assembly into a vehicle of the IHT 10. Still further, the breather tube 49 could itself be sealed and cut prior to operation to remove the seal and allow the breather 51 to be mated with the breather tube 49.

To enable the vehicle on which the IHT 10 is mounted to roll or "freewheel" without resistance from the hydraulic fluid, the IHT 10 includes a hydraulic bypass. Generally, when IHT 10 does not have a motive force being applied to it, the hydraulic pump 14 and the hydraulic motor 18 are not being rotated. Therefore, any attempt to roll the vehicle would transmit rotational energy through axle shaft 24 to the motor shaft 22, via any internal gearing, thereby causing the hydraulic motor 18 to rotate. The rotation of the hydraulic motor 18, and the action of motor pistons 19 against motor thrust bearing 37, causes fluid to flow through the hydraulic circuit of the center section 20 to the hydraulic pump 14. However, with the hydraulic pump 14 being in neutral, the resultant pressure causes resistance to motion of the motor shaft 22 and the axle shaft 24 and prevents the user from easily pushing the vehicle.

To solve this problem, a bypass mechanism 55 may be associated with the hydraulic circuit to allow fluid to flow between the high pressure side and the low pressure side of the center section 20 porting. The bypass mechanism 55 may be activated via rotation of a bypass arm 56, illustrated in FIGS. 4, 7, and 8, that is linked to the bypass mechanism 55 via a bypass actuator 59. Known bypass mechanisms include valves as well as mechanisms used to lift the hydraulic motor 18 off of the motor running surface of the center section 20.

To drive the axle shaft 24, gearing may be provided that functions to drivingly couple the axle shaft 24 to the motor shaft 22. By way of example, with reference to FIGS. 3 and 9, the motor shaft 22 may include a drive gear 23 that drivingly engages one or more reduction gears 60 which, in turn, drivingly engage a bull gear 62. The gears 60 and 62 are mounted within the first side housing section 26 and the center of rotation of the bull gear 62 may be located below that of the reduction gear(s) 60. A pair of washers 64 may be placed on either side of the bull gear 62 to provide a hardened, flat surface against which the bull gear 62 may run.

Figure 9:
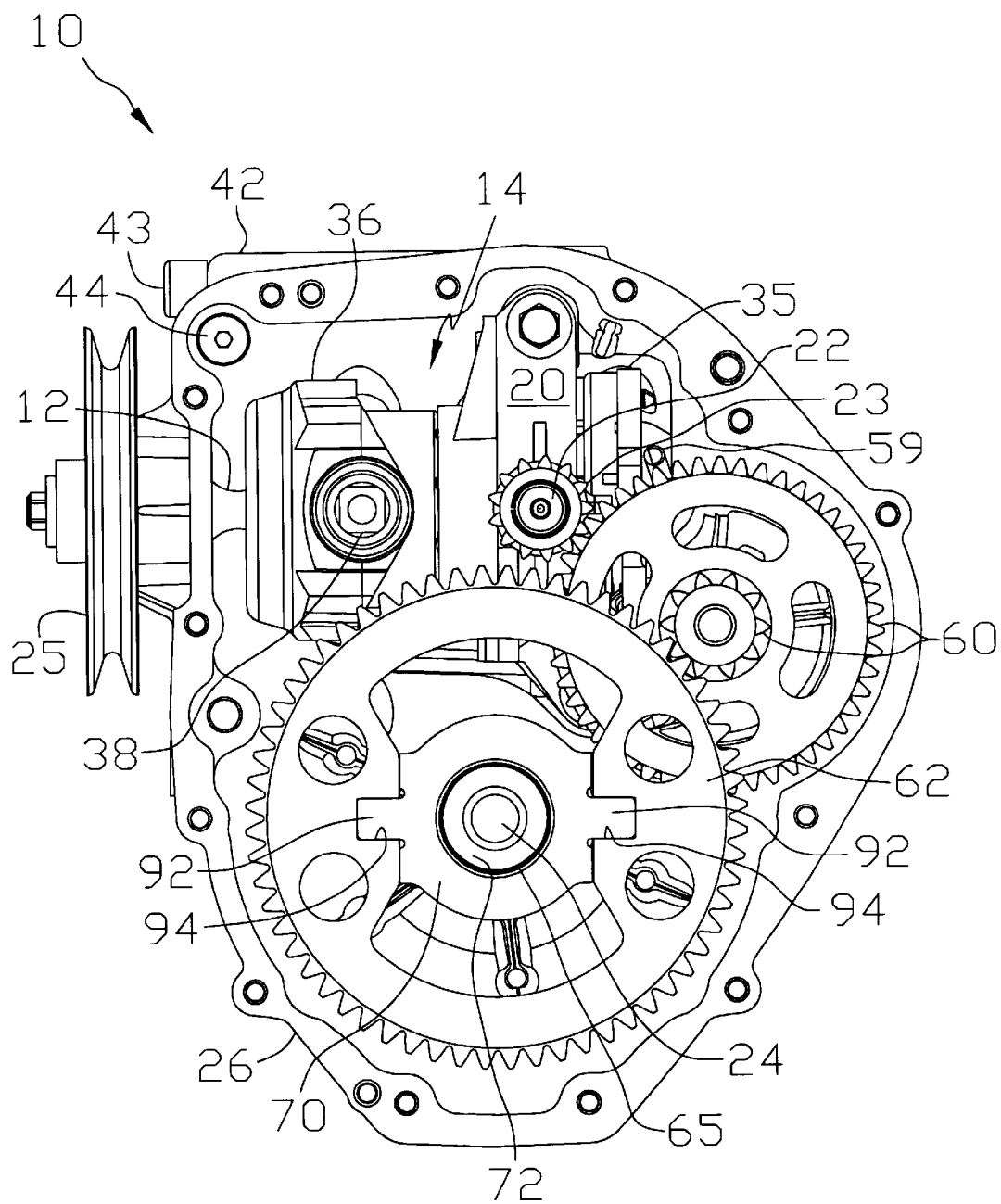
FIG. 9 illustrates a view of the interior of the exemplary hydrostatic transmission of FIG. 1.
Figure 10:
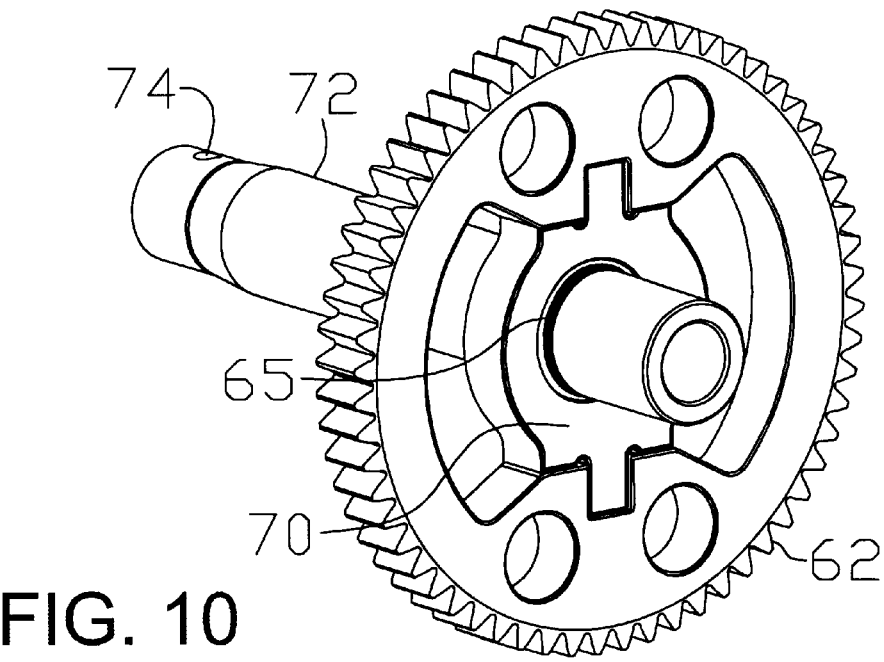
FIG. 10 illustrates a perspective view of a portion of the axle driving mechanism illustrated in FIG. 9.
Figure 11:
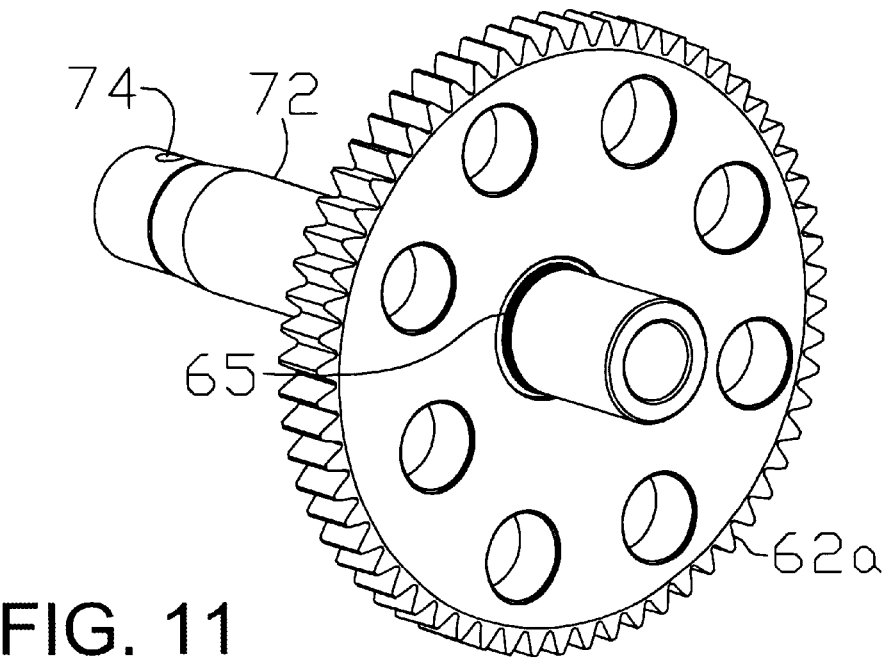
FIG. 11 illustrates a perspective view of an alternative embodiment for a portion of the axle driving mechanism illustrated in FIG. 9.
Figure 12:
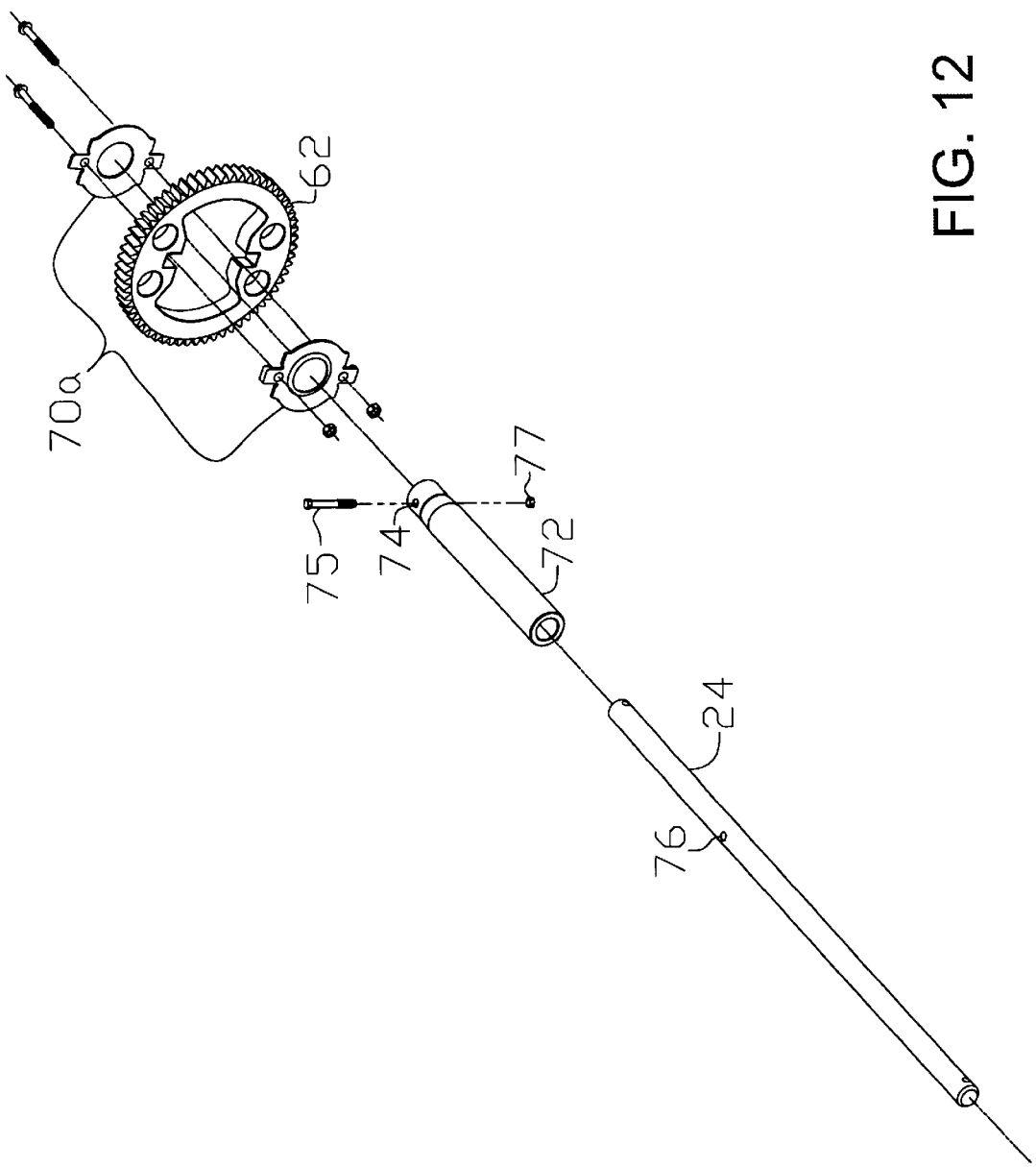
FIGS. 12–14 each illustrate an exploded view of a further alternative embodiment for a portion of the axle driving mechanism illustrated in FIG. 9.
Figure 13:
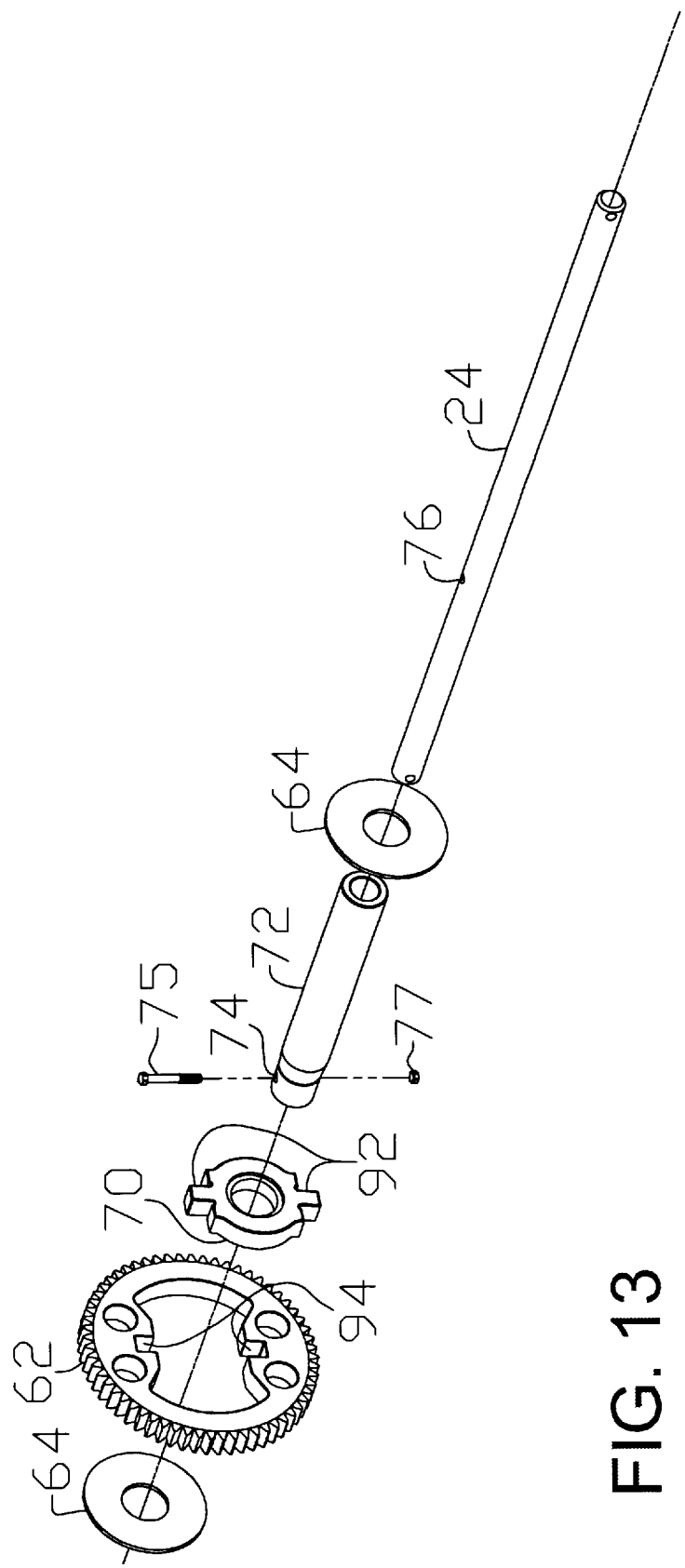

For drivingly mating the bull gear 62 to the axle shaft 24, a plate-like, interface piece 70, illustrated in FIGS. 9, 10, 12, 13, 14, 16 and 17, may be associated with the bull gear 62 which is, in turn, used to drive the axle shaft 24 in a manner described in greater detail hereinafter. The interface piece 70 may be provided with opposing tenons 92 that mate with corresponding mortises 94 formed in the bull gear 62 such that the rotation of the bull gear 62 correspondingly rotates the interface piece 70. To further secure the interface piece 70 to the bull gear 62, a powdered metal interface piece 70 can be joined to a powdered metal bull gear 62 using a brazing process or the like. The interface piece 70 can be formed as a unitary piece, as illustrated in FIGS. 9, 10, 13, 14, 16 and 17, or can be formed from multiple stamped pieces 70a that are fastened or secure together, as illustrated in FIG. 12. The interface piece 70 may also be welded to the bull gear 62, on one or both sides, to adjoin the pieces. It is preferred that the washers 64 be utilized to provide a running surface. In those cases where the interface piece 70 is not welded or brazed to the bull gear 62, the washers 64 may have increased size to further contain the interface piece 70 within the bull gear 62. As illustrated in FIG. 11, the interface piece 70 can also be omitted and the bull gear 62a formed as a unitary element that functions the same as the interface piece 70 to engage and drive the axle shaft 24 in the manner described below.

Figure 14:
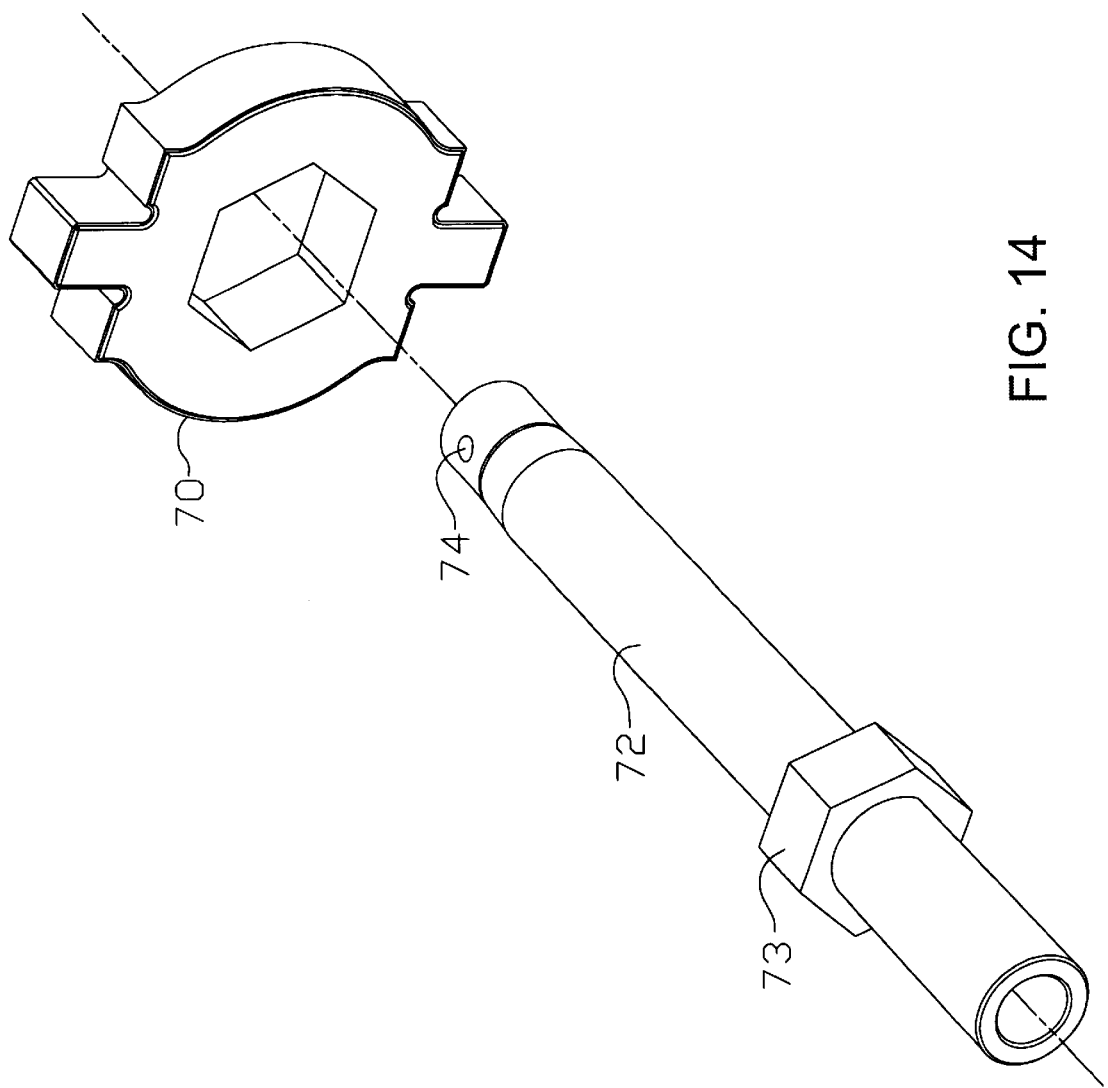
Figure 16:
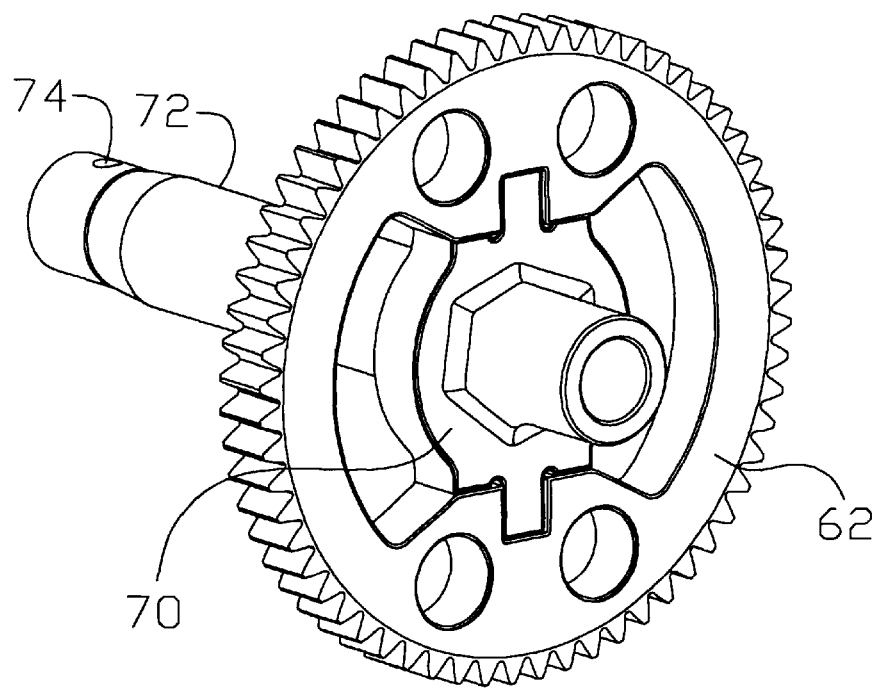
FIG. 16 illustrates a perspective view of a still further alternative embodiment for a portion of the axle driving mechanism illustrated in FIG. 9.
Figure 17:
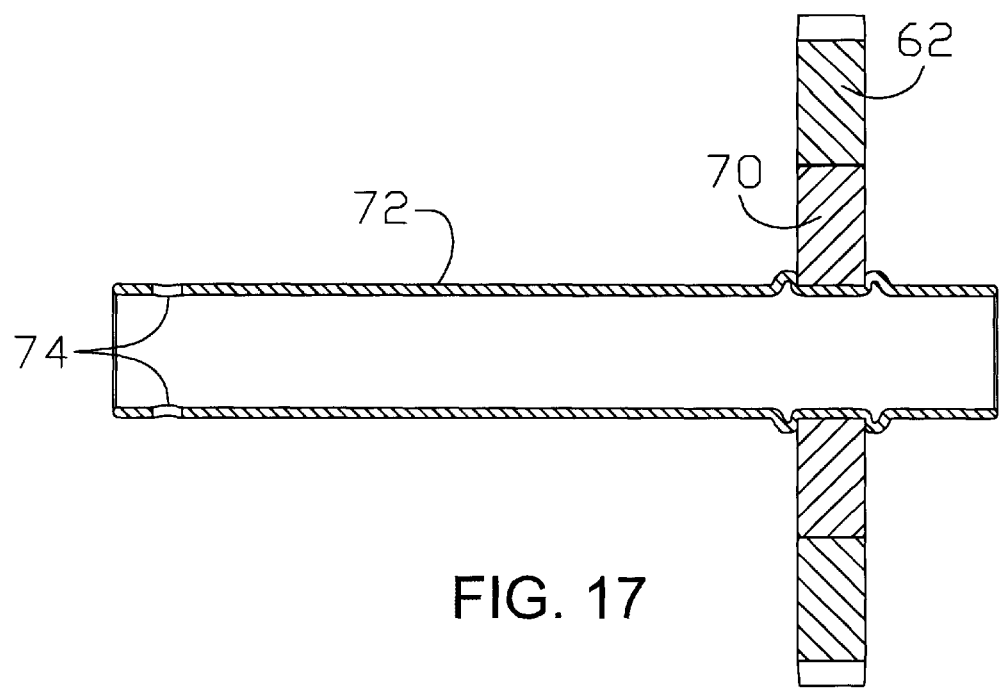
FIG. 17 illustrates a cross-section view of the embodiment for the portion of the axle driving mechanism illustrated in FIG. 16.
Figure 27:
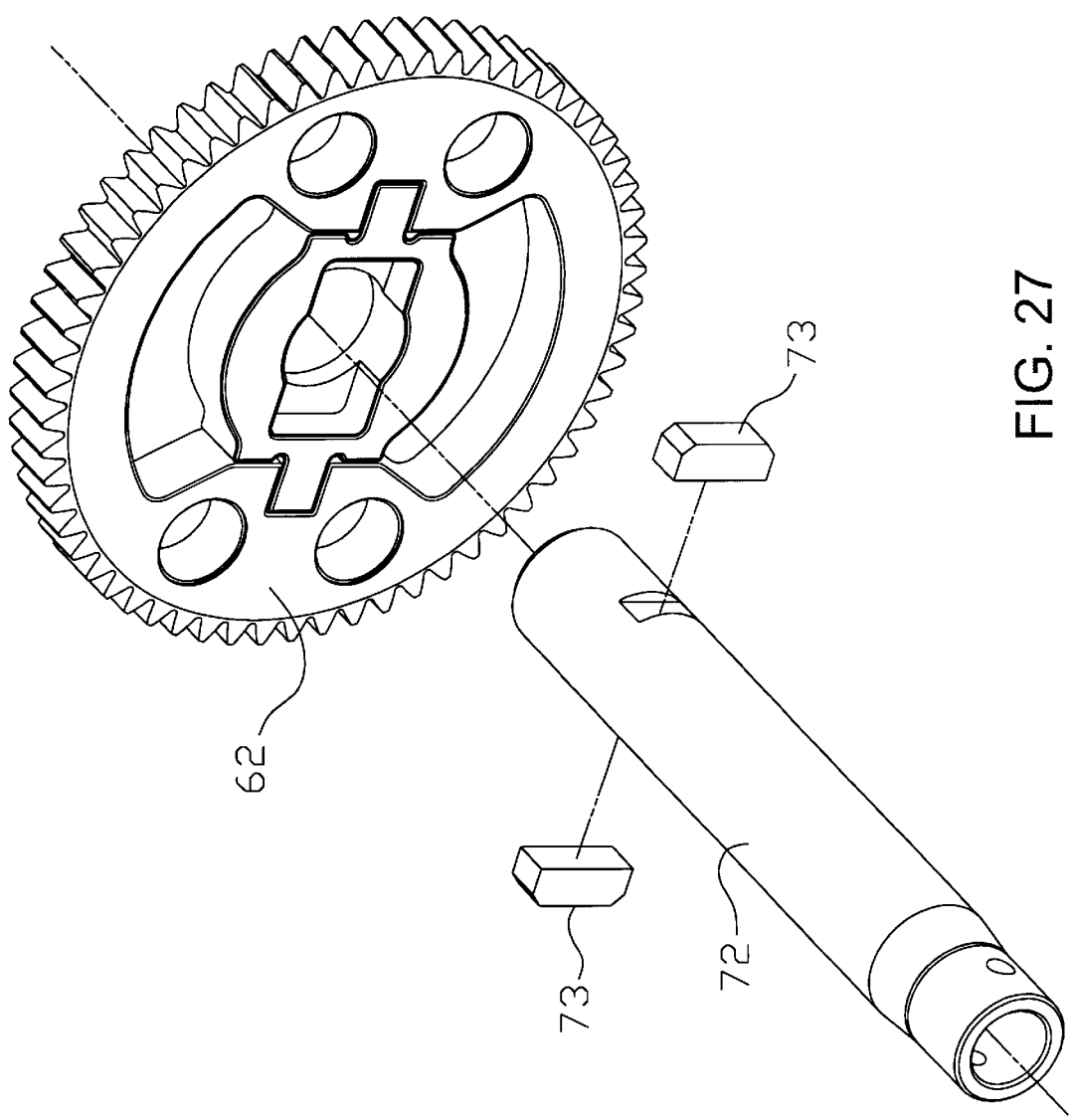
FIG. 27 illustrates an exploded view of a further alternative embodiment for a portion of the axle driving mechanism illustrated in FIG. 9.

To drive the axle shaft 24, the IHT 10 is provided with a sleeve piece 72 that is engaged with the interface piece 70 (or bull gear 62) and which drivingly carries the axle shaft 24. For example, to cause the rotation of the sleeve piece 72 in conjunction with the rotation of the interface piece 70, the sleeve piece 72 can be welded at weld points 65 to the interface piece 70 at one or both sides of the interface between the sleeve piece 72 and the interface piece 70 as illustrated in FIGS. 9–11. While primarily illustrated as having a cylindrical shape, the sleeve piece 72 can be provided with a shape having one or more flat surfaces, such as D-shaped, square, hexagonal, octagonal, etc., that mate (with or without welding) to a correspondingly keyed opening in the center of the interface piece 70 such that rotation of the interface piece 70 will likewise rotationally drive the sleeve piece 72. The sleeve piece 72 can be formed (i.e., machined, extruded, hydroformed, etc.) to have the driveable shape, as illustrated in FIGS. 16, and 17, or one or more external pieces 73 having the driveable shape can be attached to the sleeve piece 72, via welding, by providing the driveable shape with an opening having a keyed arrangement that mates with a mating keyed arrangement of the sleeve piece 72, or the like, as illustrated in FIG. 14 and 27. Still further, the sleeve piece 72 can include a splined, serrated, or wave-like portion that mates with a corresponding shape formed in the center opening of the interface piece 70 through which the sleeve piece 72 passes. When the sleeve piece 72 and interface piece 70 are provided with keyed, mating shapes and the mating shapes are not welded together, it is again preferred that washers 64 be used to provide running surfaces. For example, in the embodiment particularly illustrated in FIG. 27, the two key pieces 73 interface with flats formed on the sleeve piece 72 and in the interface piece 70 and washers 64 would be used to help constrain the keys 73 and prevent the edges from wearing away the bushings that support the sleeve piece 72 within the housing. When hydroforming is used to form the sleeve piece 72, the inside diameter can be further machined for tolerance purposes.

The linking of the sleeve piece 72 to the interface piece 70 may also be accomplished by providing threads to the sleeve piece 72 that mate with corresponding threads formed in the inner circumference of the sleeve accepting opening of the interface piece 70. In this configuration, tightening nuts could be used to maintain the engagement which nuts might use an adhesive or other means to prevent their loosening. Additionally, one or more shoulders or tapers could be formed on or added to the sleeve piece 72, as illustrated in FIGS. 16 and 17, to maintain engagement between the sleeve piece 72 and the bull gear 62 (with or without interface piece 70). When one shoulder or a taper is utilized, a nut or the like can be used to force the sleeve piece 72 and bull gear 62 together. Two shoulders can be provided to the sleeve piece 72 using the hydroforming process in which the sleeve piece is molded about the bull gear 62/interface piece 70.

Figure 2:
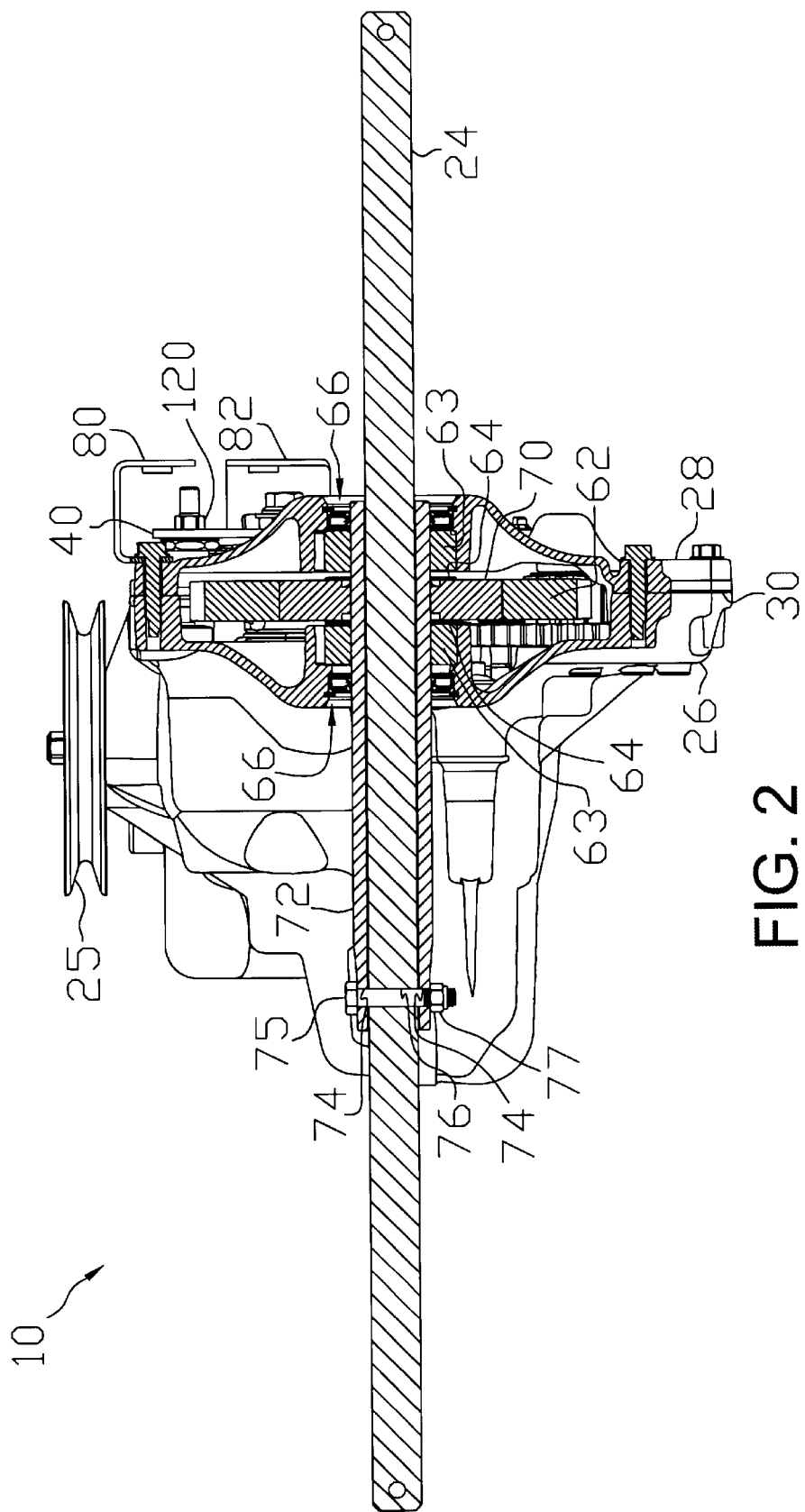
FIG. 2 illustrates a cross-sectional view of the exemplary hydrostatic transmission along line II—II of FIG. 1.
Figure 6:
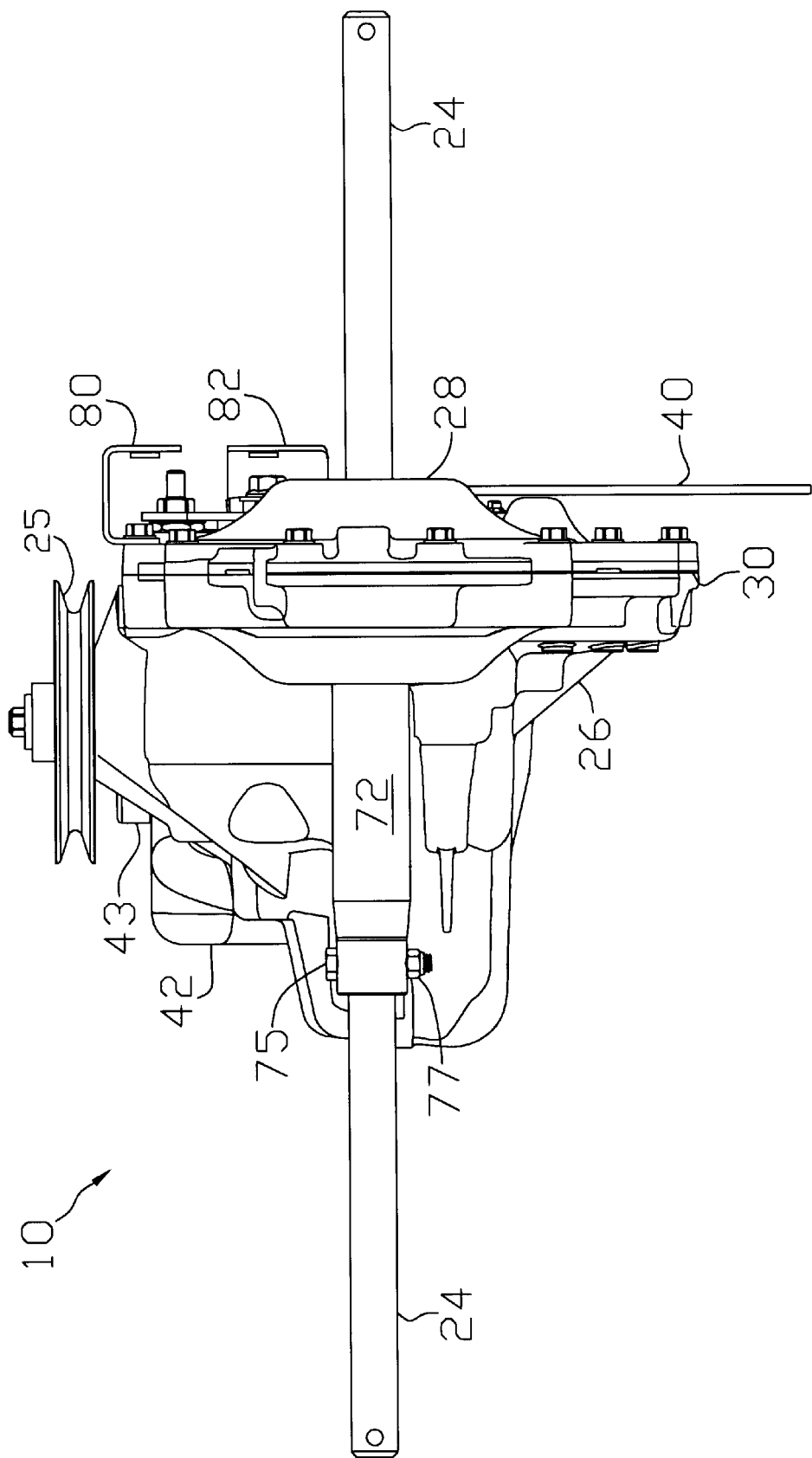
FIG. 6 illustrates a bottom side view of the exemplary hydrostatic transmission of FIG. 1.

For transferring rotational movement of the sleeve piece 72 to the axle shaft 24 disposed within the sleeve piece 72, the sleeve piece 72 is placed into engagement with the axle shaft 24. By way of example, a first end of the sleeve piece 72, which extends from the IHT housing, can be provided with opposed openings 74 with which a hole 76 in the axle shaft 24 is aligned. A fastener, such as a bolt 75, with a mating nut 77, can then be passed through the opposed openings 74 and the hole 76 to mate the sleeve piece 72 with the axle shaft 24 as illustrated in FIGS. 2 and 6. In this regard, the bolt 75 is preferably sized such that the bolt shank extends into and engages the sleeve piece 72 to prevent shearing of the bolt at its threaded portion. Bushings 63, positioned on either side of the bull gear 62, may be used to support the rotation of the sleeve piece 72. Seal and retaining rings 66, positioned in the housing adjacent to where the first end of the sleeve piece exits the housing and adjacent to the second, interior end of the sleeve piece 72, are used to seal the openings through which the sleeve piece 72 extends.

Figure 15A:
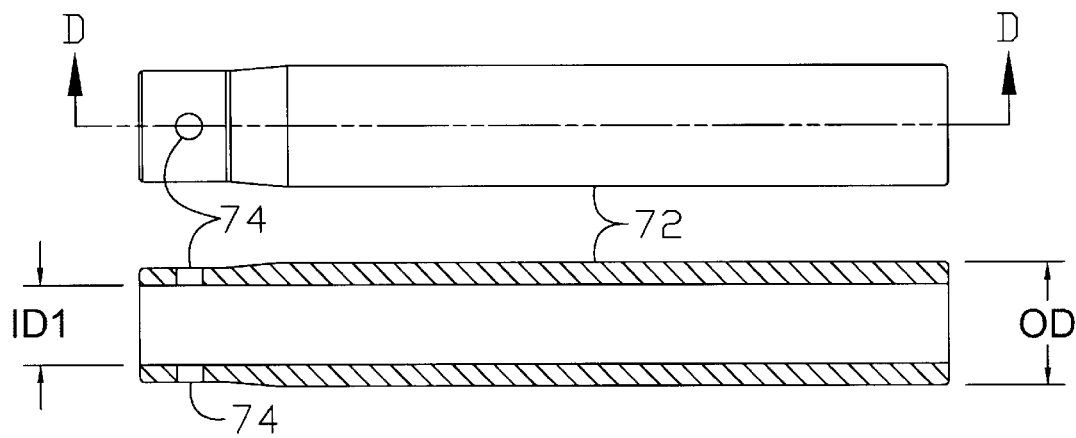
FIGS. 15a and 15b illustrate alternative embodiments and cross-sectional views of those alternative embodiments of the axle shaft tube illustrated in FIGS. 9–14.
Figure 15B:
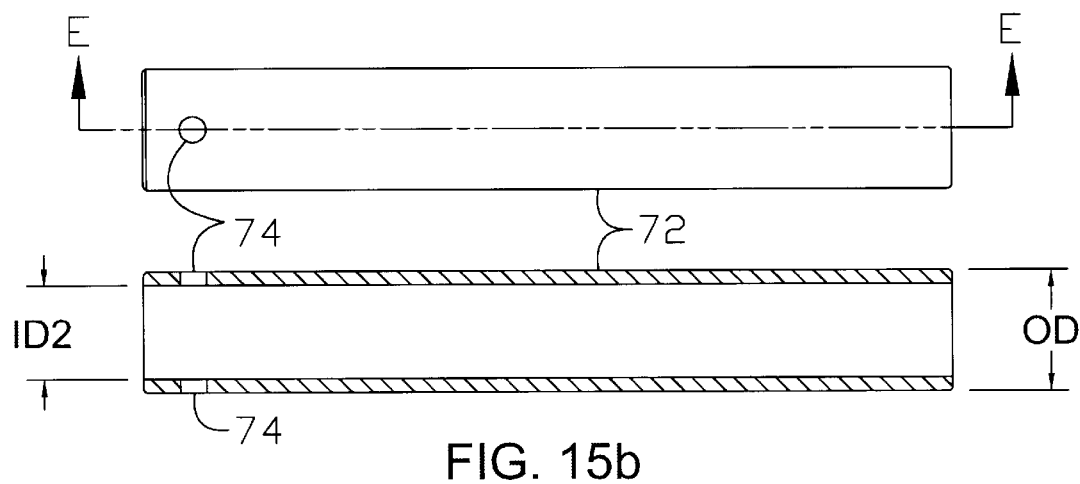

To allow axles 24 of varying diameters to be used in connection with the IHT 10, the sleeve piece 72 can be provided with varying internal diameters as illustrated in FIGS. 15a and 15b. It will be appreciated that the torque transmitted to any diameter axle shaft will remain the same since the gear train is a constant. In cases where there is a gap between the external diameter of an axle shaft 24 and the internal diameter of a sleeve piece 72, a spacer 104, illustrated in FIGS. 22–24, can be inserted between the sleeve piece 72 and the axle shaft 24. The spacer 104 could be constructed from plastic or metal.

Figure 22:
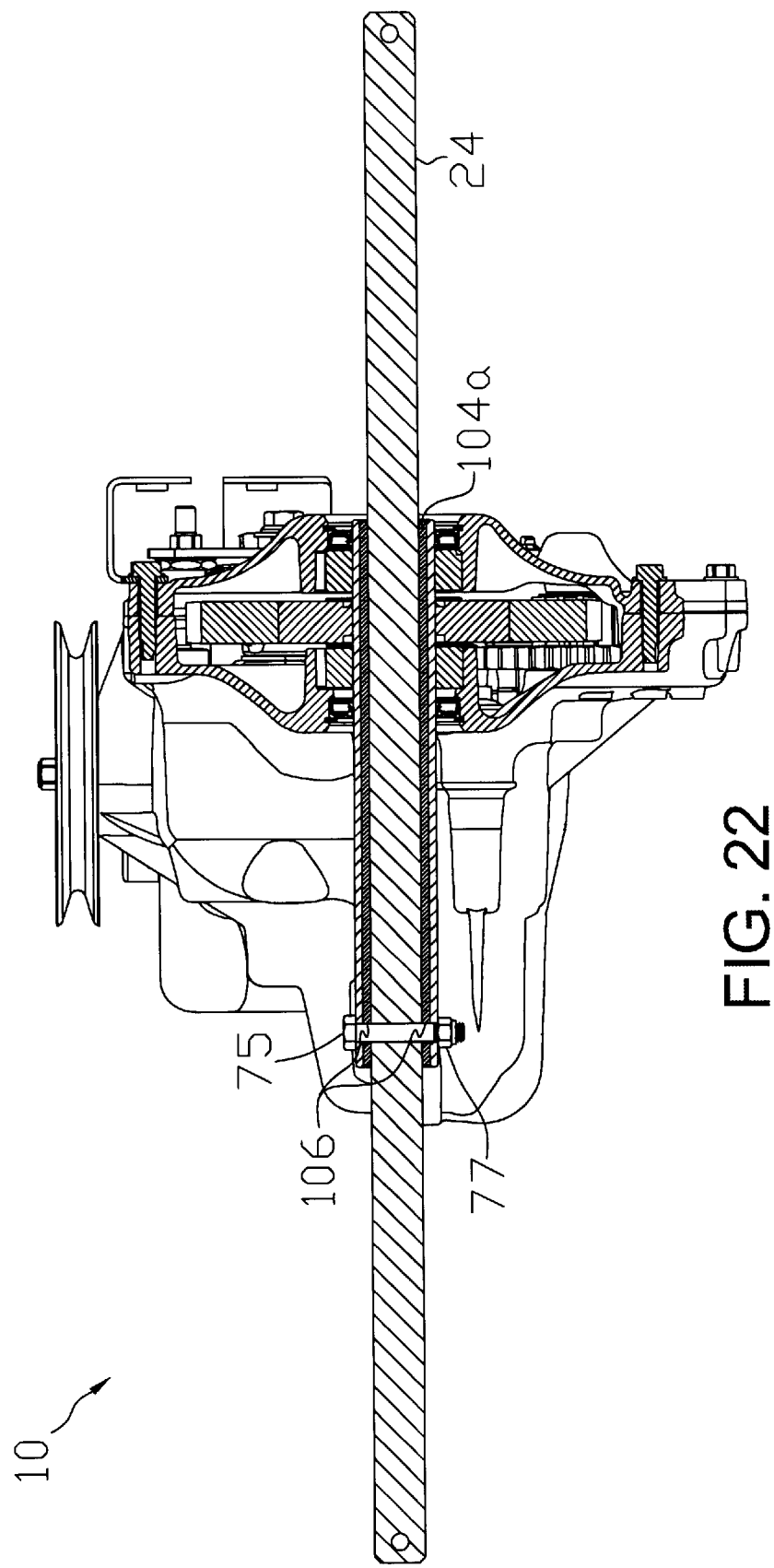
FIG. 22 illustrates a cross-sectional view of the hydrostatic transmission of FIG. 1 with an insert positioned intermediate the axle shaft and the sleeve piece.

As illustrated in FIG. 22, a spacer 104a can have a length that is substantially the same length as that provided to the sleeve piece 72. In this case, the spacer 104a would have opposed openings 106 for accepting the fastener used to place the sleeve piece 72 into driving engagement with the axle shaft 24. The fastener would also serve to maintain the spacer 104a within the sleeve piece 72. Bushings, similar to bushings 86 and 90 shown in FIG. 19, may additionally serve to maintain the spacer 104a within the sleeve piece 72.

Figure 23:
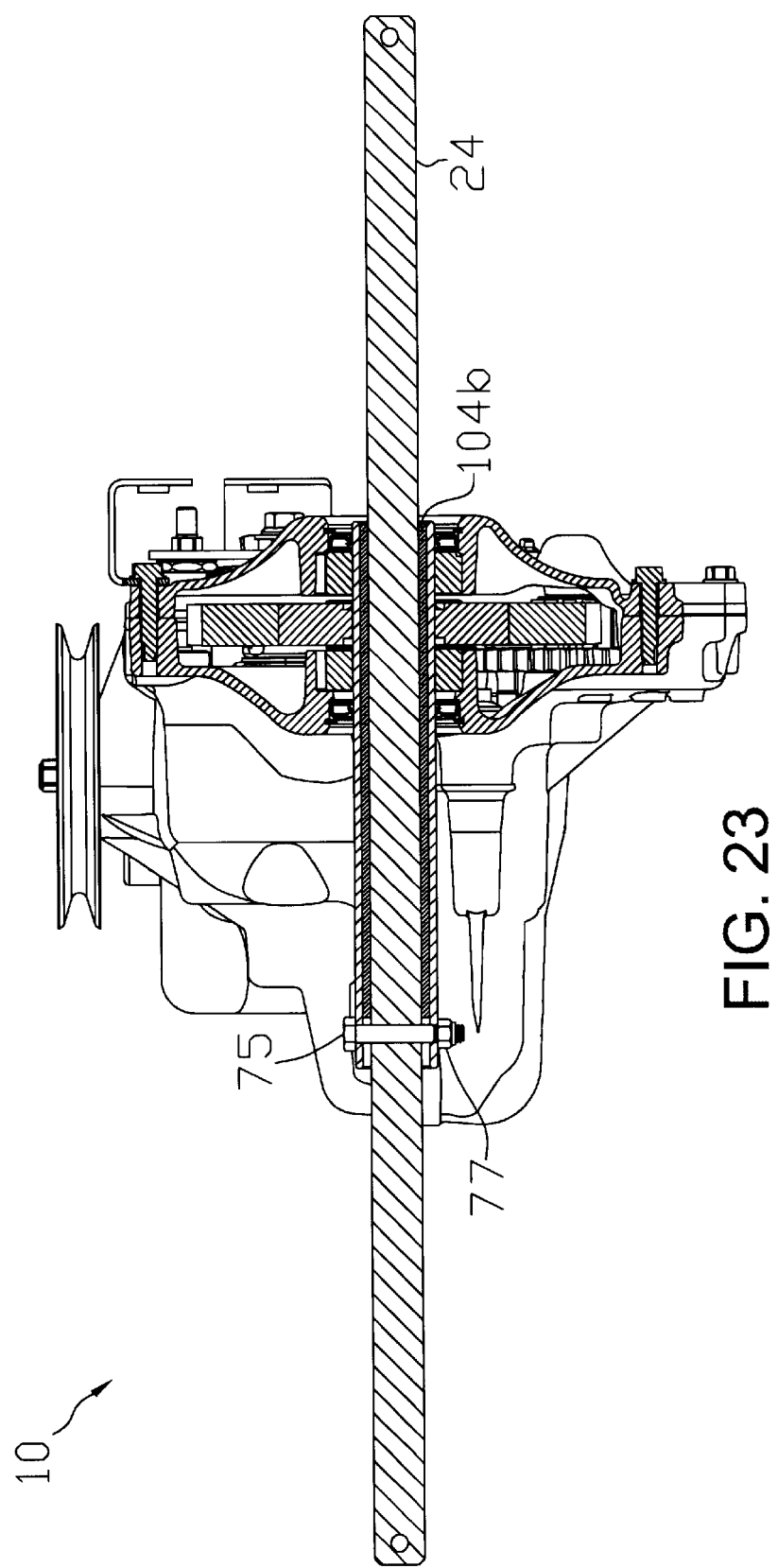
FIG. 23 illustrates a cross-sectional view of the hydrostatic transmission of FIG. 1 with an insert having an alternative embodiment positioned intermediate the axle shaft and the sleeve piece.

Alternatively, as illustrated in FIG. 23, a spacer 104b can have a length that is shorter than the sleeve piece 72. In this case, since the spacer 104b does not extend to a position under the openings 74 of the sleeve piece 72, the spacer 104b would not require the opposed openings for accepting the fastener used to place the sleeve piece 72 into driving engagement with the axle shaft 24. The spacer 104b may be maintained in position by being press fit into the sleeve piece 72. Bushings, similar to bushings 86 and 90 shown in FIG. 19, may additionally serve to maintain the spacer 104b within the sleeve piece 72.

Figure 24:
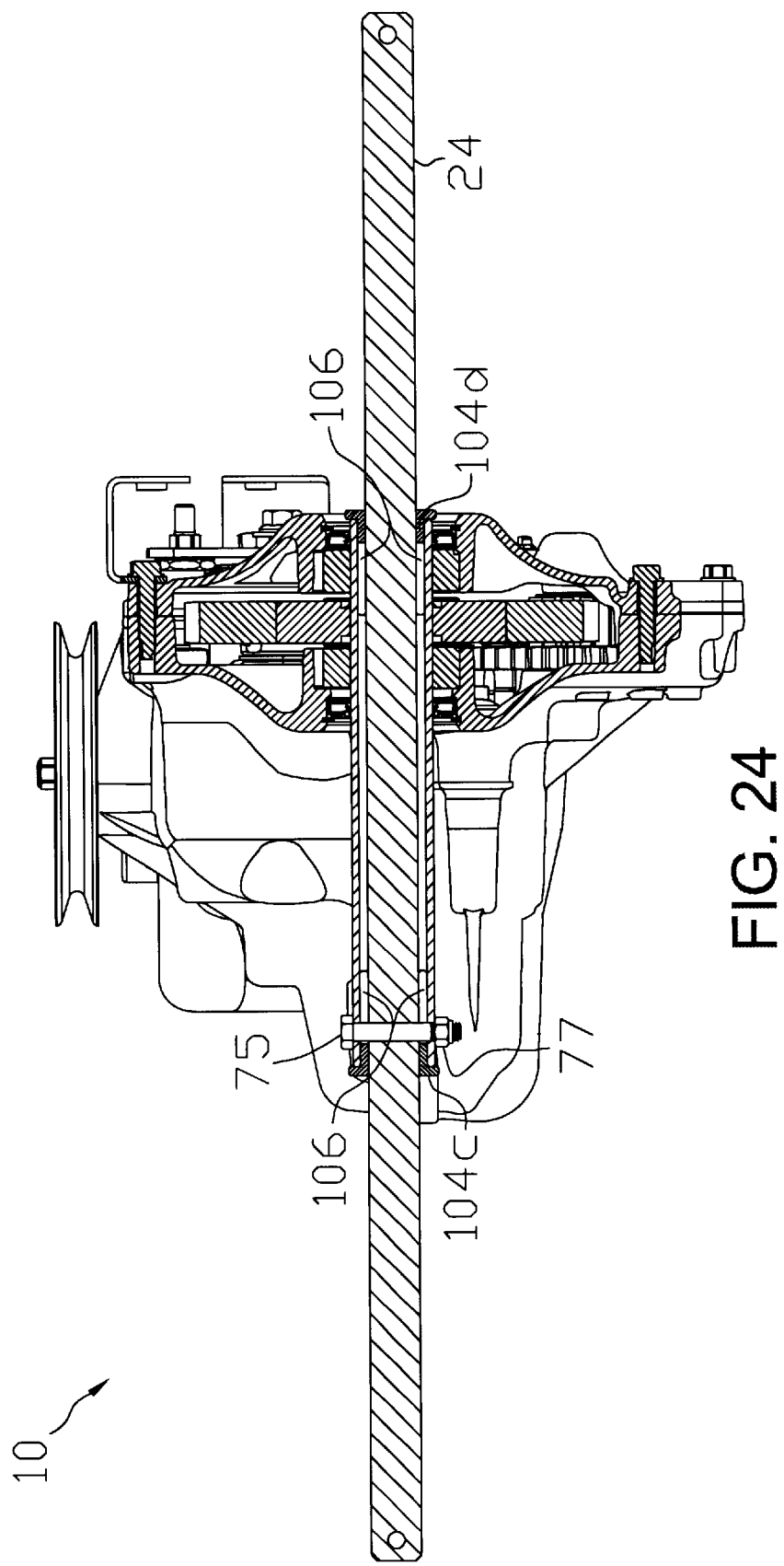
FIG. 24 illustrates a cross-sectional view of the hydrostatic transmission of FIG. 1 with an insert having still another alternative embodiment positioned intermediate the axle shaft and the sleeve piece.

Still further, as illustrated in FIG. 24, a spacer having longitudinally spaced spacer elements 104c and 104d can be used. The spacer element 104c, positioned within a first end of the sleeve piece 72, may be press fit into the gap formed between the sleeve piece 72 and the axle 24. The spacer element 104c may also have opposed openings 106, or slots, to accommodate the fastener 75 if it is desired to have the spacer element 104c be positioned under the openings 74 in the sleeve piece 72. The opposite spacer element 104d, positioned within the second end of the sleeve piece 72, may also be press fit into the gap formed between the sleeve piece 72 and the axle 24. If the spacer element 104d is constructed the same as spacer element 104c (for the purpose of making the elements interchangeable to reduce manufacturing cost), it would likewise have openings 106, or slots. Any such openings 106 would not, however, be used to accept as fastener as is apparent. Bushings, similar to bushings 86 and 90 shown in FIG. 19, may additionally serve to maintain the spacer 104b within the sleeve piece 72.

In any of the above cases, it will be appreciated that the spacer 104 need not be formed as a continuous piece about its diameter. Rather, all that is required is that the spacer 104 be provided with enough surface area to support axle shaft 24 within sleeve piece 72. For example, the spacer 104 can be provided with spaced, longitudinally oriented strips that function to fill the space between the axle shaft 24 and the sleeve piece 72.

Figure 18:
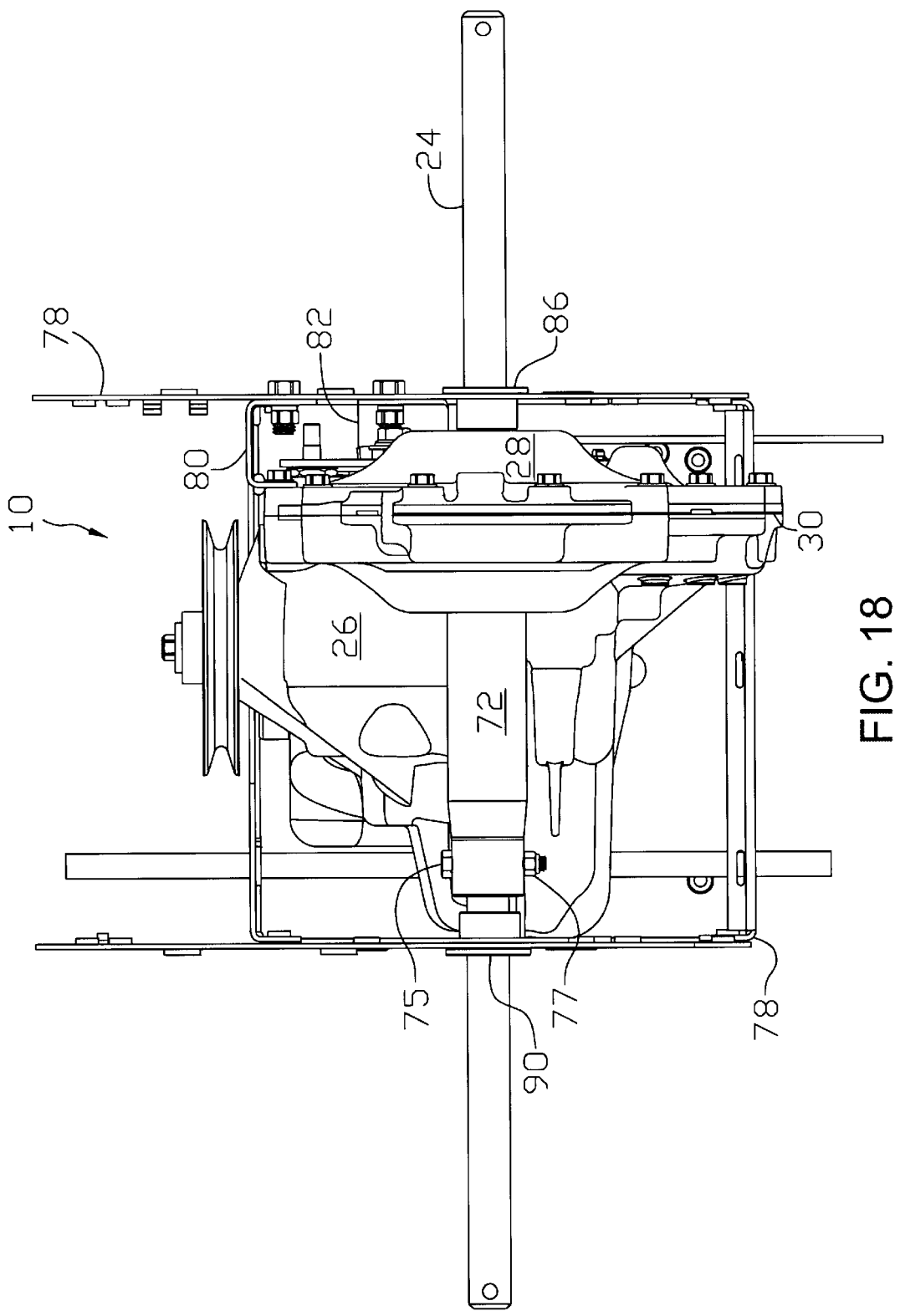
FIG. 18 illustrates a bottom view of the hydrostatic transmission of FIG. 1 mounted to a vehicle frame.
Figure 19:
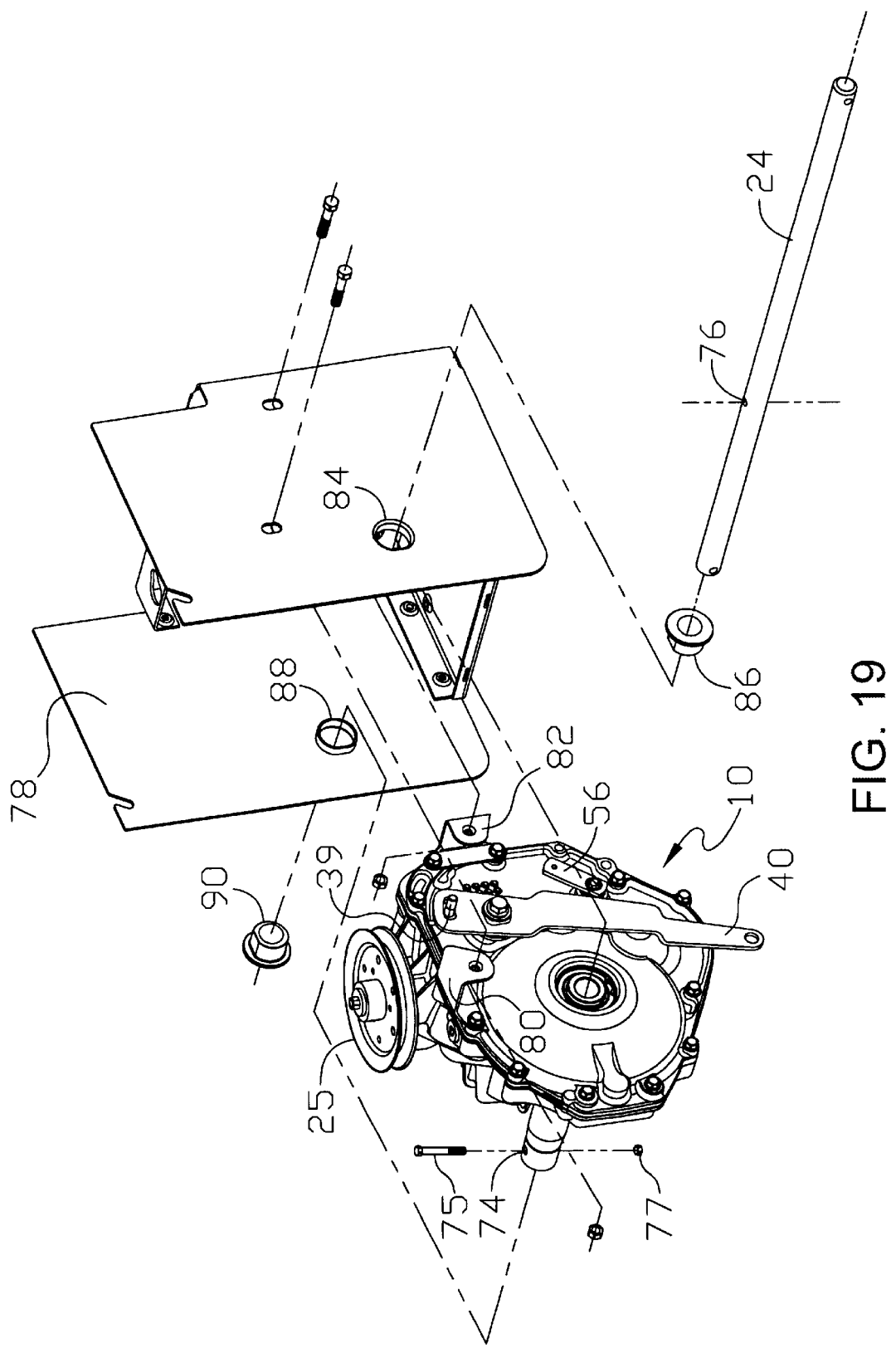
FIG. 19 illustrates an exploded view of the hydrostatic transmission and vehicle frame of FIG. 18.

To provide for the easy mounting of the IHT 10 to a vehicle frame 78, as illustrated in FIGS. 18 and 19, the IHT 10 includes a front mounting bracket 80 and a top mounting bracket 82. Generally, the front mounting bracket 80 is u-shaped having a first side that includes openings for receiving bolts that attach the front mounting bracket 80 to the IHT housing, a second side, parallel to the first side, having at least one opening for receiving a bolt that attaches the front mounting bracket 80 to a side of the vehicle frame 78, and a third side, lying in a horizontal plane, the joins the first side to the second side. Likewise, the top mounting bracket 82 is u-shaped having a first side that includes openings for receiving bolts that attaches the top mounting bracket 82 to the IHT housing, a second side, parallel to the first side, having at least one opening for receiving a bolt that attaches the top mounting bracket 82 to a side of the vehicle frame 78, and a third side, lying in a vertical plane, the joins the first side to the second side. It is preferable that the fasteners used to attach the mounting brackets to the housings be the same fasteners used to attach the first side housing 26 to second side housing 28.

When the IHT 10 housing is mounted to the side of the vehicle frame 78, the axle shaft 24 may be inserted through a first opening 84 in the vehicle frame 78, having a bushing 86, and into the sleeve piece 72 until the hole in the axle shaft 24 is aligned with the holes formed in the sleeve piece 72 and the axle shaft extends from a second opening 88 in the vehicle frame 78, having a bushing 90. The axle shaft 72 may then be secured within the sleeve piece 72 using a bolt 75 and nut 77 as described above. In this manner, the IHT 10 is supported within the frame 78 without the need for forming slots in the frame 78 or the need for additional supporting hardware used to maintain the axle shaft 72 within such slots.

Turning to FIG. 25, the IHT is illustrated as being mounted to the frame 78 of a snow thrower. In this case, the input shaft 12 is horizontally positioned and the pulley 25 is vertically oriented to receive a motive force from the engine 102. The engine 102 may also drive the snow throwing auger via a pulley 125 mounted to an auger shaft 112. The IHT 10 is mounted to a side of the frame 78 in the manner described above. Thus, the junction surface 30 between the housing sections 26 and 28 lies in a plane that is vertically oriented and parallel to the side of the frame 78 to which the IHT 10 is mounted. From this description, the orientation of the remaining components of the IHT 10 with respect to the side of the frame 78 to which the IHT 10 is mounted can be easily determined and, therefore, need not be discussed in greater detail. While the mounting of IHT 10 is preferably to the side of frame 78 to simplify attachment, mounting brackets 80 and 82 could be oriented and positioned in other locations to facilitate attachment of IHT 10 to any portion of frame 78.

Figure 26:
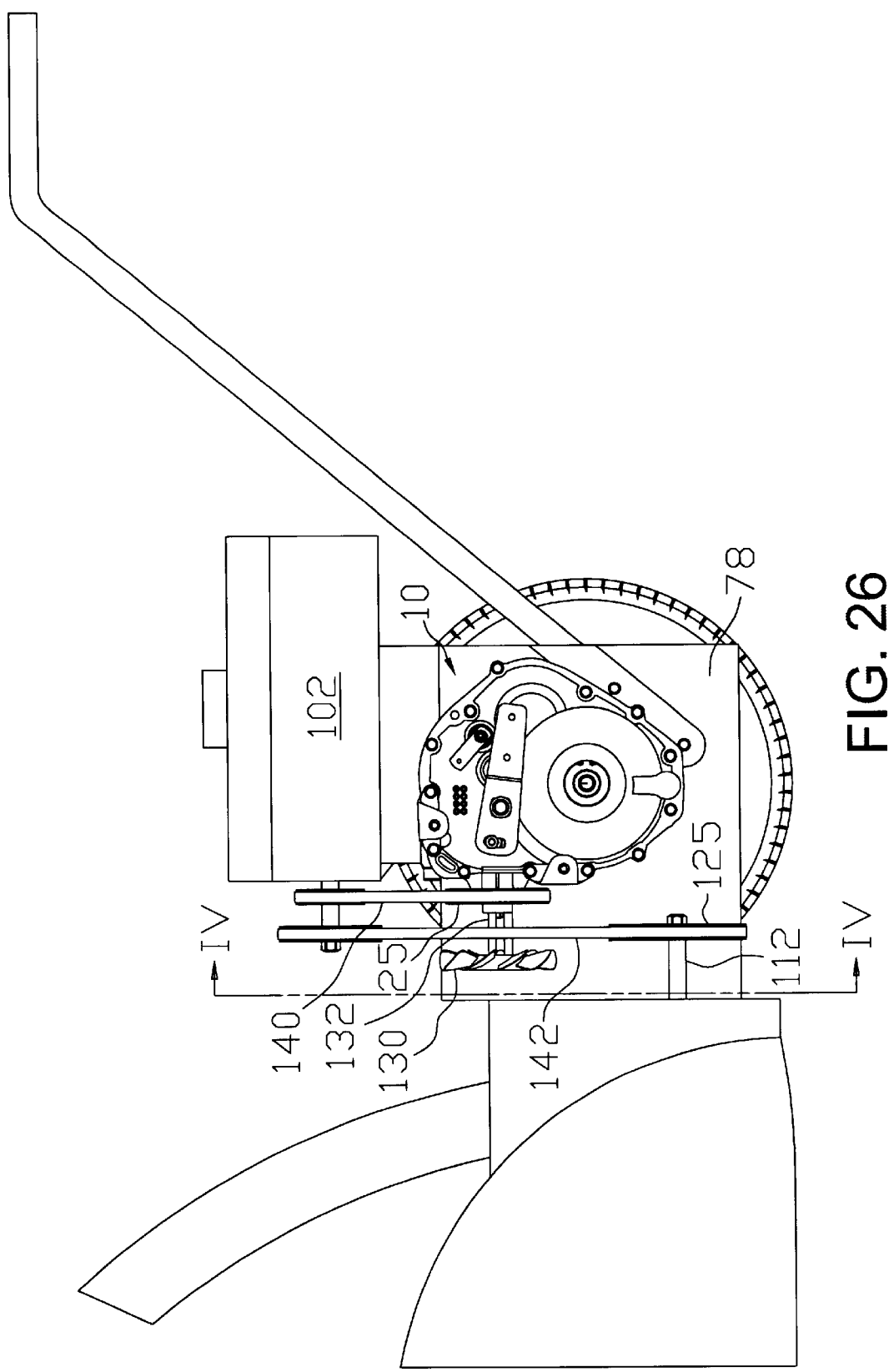
FIG. 26 illustrate a side view of the hydrostatic transmission of FIG. 1, including a fan, mounted to a vehicle frame, in the form of a snow-thrower, in which a tire, some framework, and some controls have been removed for the sake of clarity.
Figure 28:
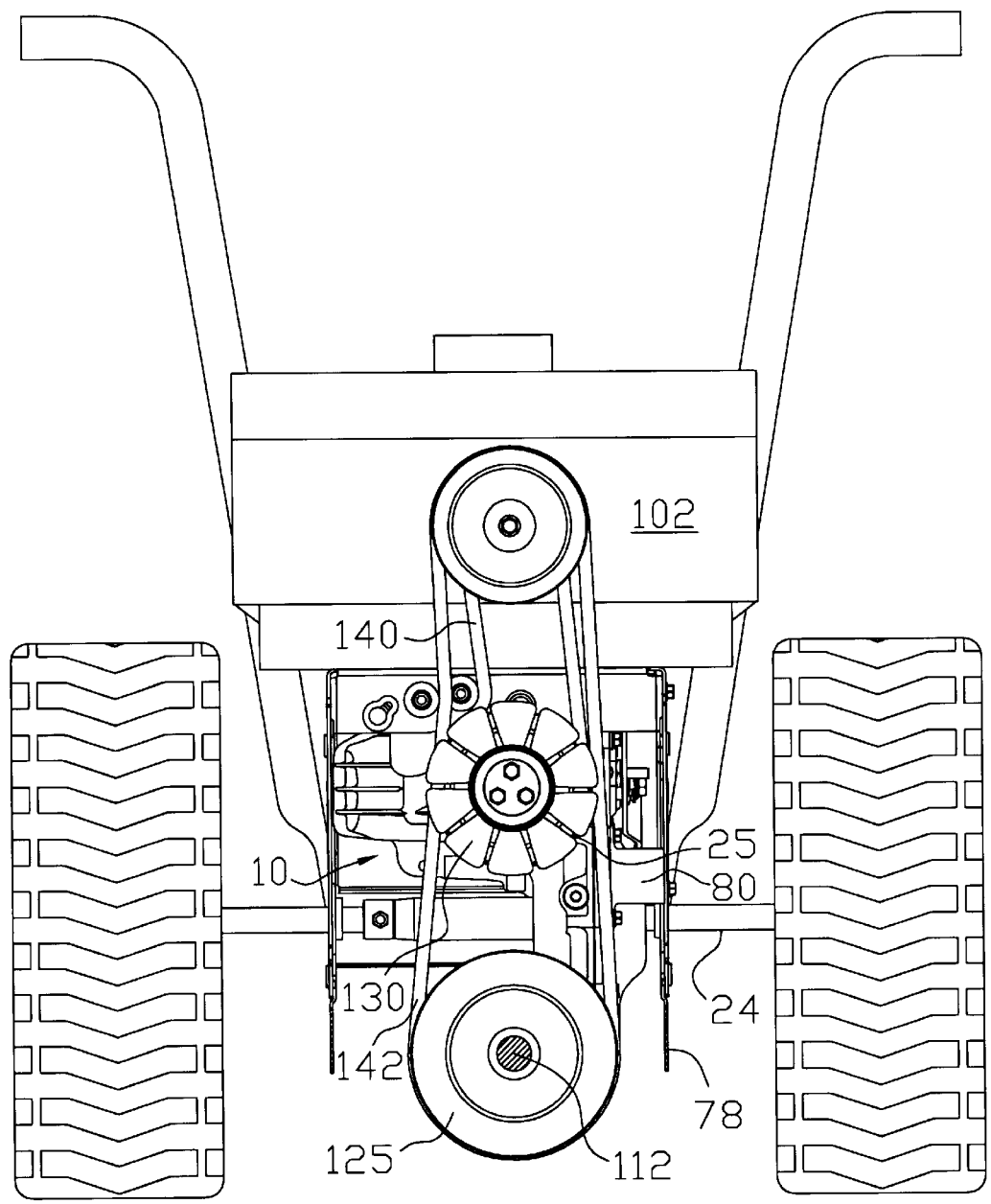
FIG. 28 illustrates a view of the mounted hydrostatic transmission along line IV–IV of FIG. 26.

To provide a means for cooling the IHT 10 a fan 130 may be provided. As illustrated in FIGS. 26 and 28, the fan 130 may be positioned so as to extend between the belts 140, 142 that are used to drive the pulleys 25 and 125, respectively. In the illustrated embodiment, three spacers 132, to which the fan 130 is attached, are used to extend the shaft 12 between the belts 140, 142.

Figure 29:
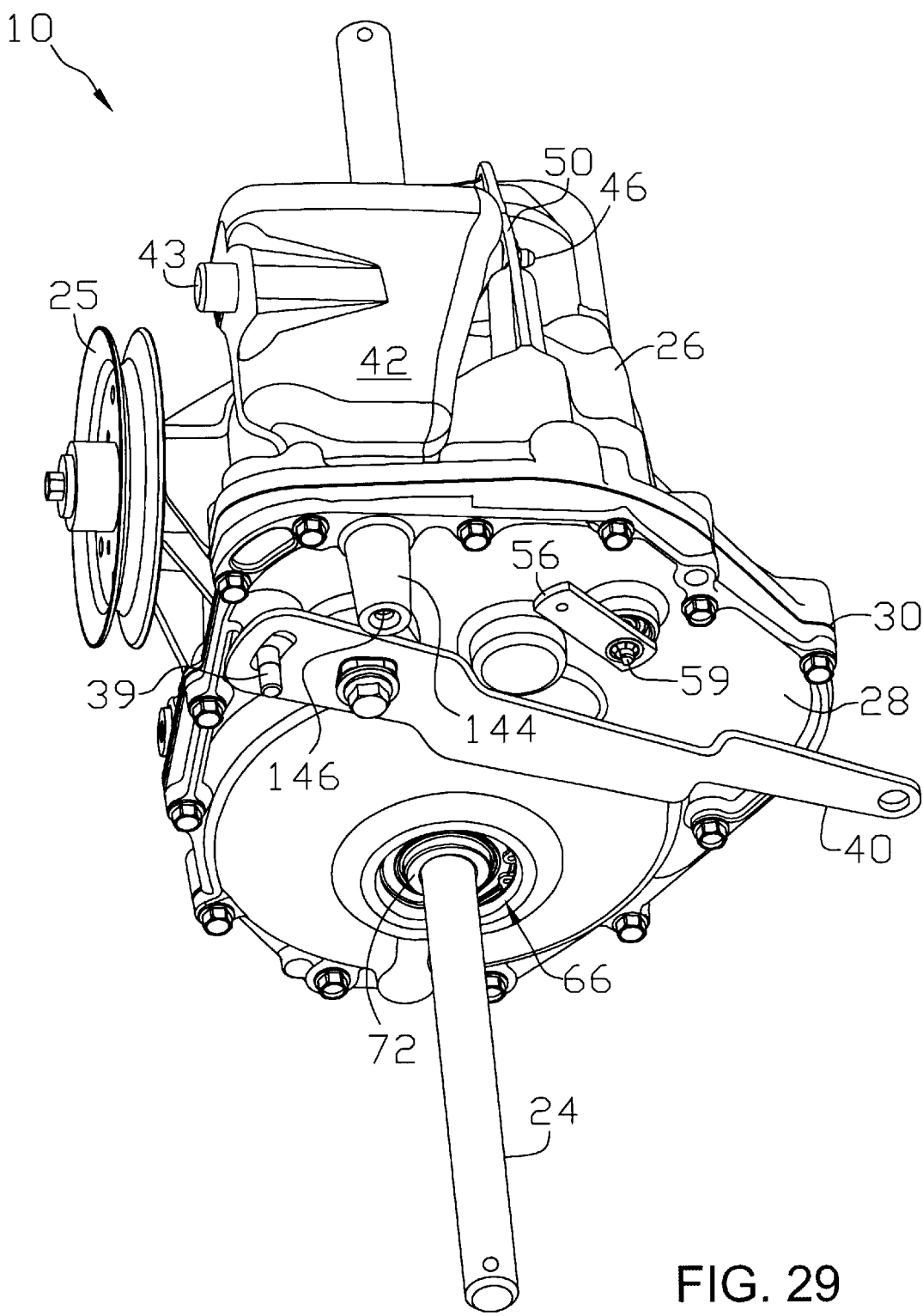
FIG. 29 illustrates a perspective view of an alternative, exemplary embodiment of the hydrostatic transmission of FIG. 1 having a boss for mounting the hydrostatic transmission to a vehicle frame.

Turning to FIG. 29, in yet another alternative embodiment of the IHT 10, a boss 144 with a fastener accepting opening 146 is attached or formed on the side of the housing 28. The fastener accepting opening 146 is adapted to align with an opening formed in a side frame member 78 through which a fastener is passed into engagement with the boss 144. As will be appreciated, the fastener accepting opening 146 could be threaded or unthreaded to accept a self tapping fastening device. It is also anticipated that the frame could be designed to fully support the axle shafts to thereby eliminate the need for bushings 86 and 90. In particular, the bushings 86 and 90 could be eliminated with the proper selection of frame material and length of axle shaft support. Coatings are also known that have friction-reducing properties that would enhance the ability to use the frame as a bearing surface.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A hydrostatic transmission comprising:
   a hydraulic pump;
   a hydraulic motor driven by the hydraulic pump; and
   a sleeve piece driven by the hydraulic motor, the sleeve piece releasably receiving and driving an axle shaft.

2. The hydrostatic transmission as recited in claim 1, wherein the hydraulic motor drives a motor shaft and the transmission further comprises gearing for transferring a driving force from the motor shaft to the sleeve piece.

3. The hydrostatic transmission as recited in claim 2, wherein the gearing comprises a bull gear that drives the sleeve piece.

4. The hydrostatic transmission as recited in claim 3, wherein the bull gear comprises an interface piece that drives the sleeve piece.

5. The hydrostatic transmission as recited in claim 4, wherein the bull gear and the interface piece are formed from powdered metal.

6. The hydrostatic transmission as recited in claim 5, wherein the bull gear and the interface piece are brazed together.

7. The hydrostatic transmission as recited in claim 4, wherein the interface piece is formed from a metal stamping.

8. The hydrostatic transmission as recited in claim 7, wherein the interface piece comprises a first interface piece member and a similarly arranged second interface piece member bolted to the first interface piece member.

9. The hydrostatic transmission as recited in claim 4, wherein the interface piece is welded to the sleeve piece.

10. The hydrostatic transmission as recited in claim 4, wherein the sleeve piece is provided with a driveable shape that mates with a correspondingly shaped opening in the interface piece.

11. The hydrostatic transmission as recited in claim 10, wherein the driveable shape is formed on the sleeve piece.

12. The hydrostatic transmission as recited in claim 10, wherein the driveable shape is formed on an attachment piece attached to the sleeve piece.

13. The hydrostatic transmission as recited in claim 10, wherein the driveable shape comprises a shape having at least one planar surface.

14. The hydrostatic transmission as recited in claim 10, wherein the driveable shape comprises a serration.

15. The hydrostatic transmission as recited in claim 4, wherein the sleeve piece has threading formed thereon for mating with threading formed on the interface piece.

16. The hydrostatic transmission as recited in claim 15, further comprising retaining nuts matable with the threading of the sleeve piece for maintaining engagement between the interface piece and the sleeve piece.

17. The hydrostatic transmission as recited in claim 3, further comprising a pair of washers through which the sleeve piece passes providing a running surface for the bull gear.

18. The hydrostatic transmission as recited in claim 3, further comprising a reduction gear linking the motor shaft to the bull gear.

19. The hydrostatic transmission as recited in claim 18, wherein a center of rotation of the reduction gear and a center of rotation of the bull gear are positioned below the hydraulic pump.

20. The hydrostatic transmission as recited in claim 1, further comprising a center section on which the hydraulic pump and the hydraulic motor rotate.

21. The hydrostatic transmission as recited in claim 1, further comprising a housing in which the hydraulic pump, the hydraulic motor, and the sleeve piece are carried.

22. The hydrostatic transmission as recited in claim 21, wherein the housing comprises a first housing section and a second housing section joined along a vertical junction surface and the axis of the sleeve piece is perpendicular to the junction surface.

23. The hydrostatic transmission as recited in claim 21, wherein the sleeve piece has a first end that extends from the housing.

24. The hydrostatic transmission as recited in claim 23, wherein the first end of the sleeve piece has opposed openings for accepting a fastener used to place the sleeve piece in engagement with the axle.

25. The hydrostatic transmission as recited in claim 24, wherein a second end of the sleeve piece is disposed within the housing.

26. The hydrostatic transmission as recited in claim 1, wherein the sleeve piece is formed using a hydroforming process.

27. The hydrostatic transmission as recited in claim 21, wherein the housing is adapted to be mounted to the frame of a snow thrower.

28. The hydrostatic transmission as recited in claim 27, wherein the housing includes first and second mounting brackets for use in mounting the housing to a vertically oriented side frame of the snow thrower.

29. The hydrostatic transmission as recited in claim 28, wherein the first mounting bracket extends from a side of the housing and the second mounting bracket extends from a top of the housing.

30. The hydrostatic transmission as recited in claim 21, wherein the housing comprises a boss for attaching the housing to a vehicle frame.

31. The hydrostatic transmission as recited in claim 21, further comprising a return to neutral mechanism mounted to the housing for eliminating flow of the hydraulic fluid between the hydraulic pump and the hydraulic motor.

32. The hydrostatic transmission as recited in claim 21, further comprising a bypass mechanism mounted to the housing for breaking a fluid connection between the hydraulic pump and the hydraulic motor.

33. The hydrostatic transmission as recited in claim 4, wherein the interface piece comprises tenons and the bull gear comprises mortises for accepting the tenons.

34. The hydrostatic transmission as recited in claim 33, wherein the interface piece is in floating engagement with the bull gear.

35. The hydrostatic transmission as recited in claim 34, further comprising a pair of washers through which the sleeve piece passes providing a running surface for the interface piece and the bull gear.

36. The hydrostatic transmission as recited in claim 33, wherein the interface piece is brazed to the bull gear.

37. The hydrostatic transmission as recited in claim 21, further comprising an input shaft and a fan associated with the input shaft.

38. A vehicle comprising:
  a vehicle frame having a vertically oriented side frame portion;
  a housing, mounted to the side frame portion, comprised of a first housing section and a second housing section joined along a vertical junction surface that is parallel to the side frame portion;
  a hydraulic pump and a hydraulic motor mounted within the housing, the hydraulic motor being driven by the hydraulic pump via a hydraulic circuit; and
  an axle carried within the housing and driven by the hydraulic motor, the axle having a longitudinal axis that is perpendicular to the side frame portion.

39. The vehicle as recited in claim 38, wherein the axle is removeably carried within the housing.

40. The vehicle as recited in claim 39, further comprising a sleeve piece carried by the housing, the sleeve piece being driven by the hydraulic motor and releasably accepting and driving the axle shaft.

41. The vehicle as recited in claim 40, wherein the side frame portion has an opening for accepting the axle shaft.

42. The vehicle as recited in claim 40, further comprising a center section having porting wherein the hydraulic pump is mounted to the center section, the hydraulic motor is mounted to the center section, and hydraulic motor and the hydraulic pump are in fluid communication via the porting.

43. The vehicle as recited in claim 42, wherein the center section has a pump running surface on which the hydraulic pump rotates, the pump running surface being in a vertical plane oriented perpendicular to the side frame portion.

44. The vehicle as recited in claim 43, wherein the center section has a motor running surface on which the hydraulic motor rotates, the motor running surface being in a horizontal plane.

45. The vehicle as recited in claim 38, further comprising a motor shaft driven by the hydraulic motor, a reduction gear driven by the motor shaft, and a bull gear driven by the reduction gear and drivingly linked to the axle.

46. The vehicle as recited in claim 45, further comprising a sleeve piece disposed intermediate the bull gear and the axle, the sleeve piece being driven by the bull gear and driving the axle.

47. The vehicle as recited in claim 46, wherein the axle is removeably matable with the sleeve piece.

48. The vehicle as recited in claim 41, wherein a center of rotation of the reduction gear and a center of rotation of the bull gear are below a position of the hydraulic motor.

49. The vehicle as recited in claim 48, wherein the center of rotation of the bull gear is below the center of rotation of the reduction gear.

50. The vehicle as recited in claim 45, wherein the motor shaft has a longitudinal axis that is parallel to the longitudinal axis of the axle.

51. The vehicle as recited in claim 38, further comprising a combustion engine for driving the hydraulic motor.

52. The vehicle as recited in claim 51, further comprising a snow throwing auger driven by the combustion engine.

53. A method for manufacturing a vehicle, comprising:

mounting to a vehicle frame having opposed side frame members having opposed openings a hydrostatic transmission housing comprising a sleeve portion having longitudinally opposed openings into which an axle shaft is insertable such that the longitudinally opposed openings of the sleeve portion are aligned with the opposed opening of the side frame members;

inserting an axle shaft into the sleeve member through the opening in one of the side frame members and the aligned longitudinal opening of the sleeve member such that the axle shaft extends from the sleeve member through the opposed openings of both side frame members; and attaching the axle shaft to the sleeve member such that rotation of the sleeve member drives the axle shaft.

54. The method as recited in claim 53, wherein the axle shaft has an opening formed through a diameter of the axle shaft and the sleeve member has opposed openings formed so as to be aligned across a diameter of the sleeve member, and attaching the axle shaft to the sleeve member comprises aligning and inserting a fastener in the opening formed through a diameter of the axle shaft and the opposed openings formed so as to be aligned across a diameter of the sleeve member.

55. The method as recited in claim 54, wherein the fastener comprises a bolt.

56. The method as recited in claim 55, further comprising inserting a spacer into a gap formed between the exterior of the axle shaft and the interior of the sleeve member.

57. The method as recited in claim 55, further comprising inserting bushings into the openings formed in the side frame members in which the axle shaft is supported.

58. The method as recited in claim 53, wherein the housing comprises first and second mounting brackets for attaching the housing to one of the side frame members.

59. The method as recited in claim 53, herein the housing comprises a boss for attaching the housing to one of the side frame members.

60. A snow thrower vehicle, comprising:

a vehicle frame;

a snow thrower assembly mounted to the vehicle frame driven by a snow thrower input shaft having an attached snow thrower pulley;

a hydrostatic transmission mounted to the vehicle frame driven by a transmission input shaft having an attached transmission pulley;

an engine mounted to the vehicle frame driving an output shaft having a first output pulley and a second output pulley;

a first belt connecting the first output pulley to the snow thrower pulley;

a second belt connecting the second output pulley to the transmission pulley; and a cooling fan mounted on the transmission input shaft, where the transmission input shaft extends through a loop created by the first belt, whereby the cooling fan and transmission are on opposite sides of the first belt.

* * * * *

UNITED STATES PATENT AND TRADEMARK OFFICE
CERTIFICATE OF CORRECTION

PATENT NO. : 6,651,529 B1 Page 1 of 1
DATED : November 25, 2003
INVENTOR(S) : Poplawski et al.

It is certified that error appears in the above-identified patent and that said Letters Patent is hereby corrected as shown below:

<u>Title page,</u>
Item [75], Inventors, change the first named inventor to read as follows:
-- Herb M. Poplawski --

Signed and Sealed this

Twenty-second Day of June, 2004

JON W. DUDAS
*Acting Director of the United States Patent and Trademark Office*